(12) United States Patent
Miller et al.

(10) Patent No.: US 10,411,729 B2
(45) Date of Patent: Sep. 10, 2019

(54) TECHNOLOGIES FOR ALLOCATING EPHEMERAL DATA STORAGE AMONG MANAGED NODES

(71) Applicant: Intel Corporation, Santa Clara, CA (US)

(72) Inventors: Steven C. Miller, Livermore, CA (US); David B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 15/395,550

(22) Filed: Dec. 30, 2016

(65) Prior Publication Data

US 2018/0026907 A1 Jan. 25, 2018

Related U.S. Application Data

(60) Provisional application No. 62/365,969, filed on Jul. 22, 2016, provisional application No. 62/376,859, (Continued)

(51) Int. Cl.
*G06F 15/173* (2006.01)
*H03M 7/30* (2006.01)
(Continued)

(52) U.S. Cl.
CPC ....... *H03M 7/3084* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); (Continued)

(58) Field of Classification Search
USPC ........ 709/226, 215, 246, 212, 213, 214, 216
See application file for complete search history.

(56) References Cited

U.S. PATENT DOCUMENTS

| 7,107,403 B2 | 9/2006 | Modha et al. |
| 2007/0283015 A1 | 12/2007 | Jackson et al. |

(Continued)

OTHER PUBLICATIONS

International search report for PCT application No. PCT/US2017/038150, dated Oct. 17, 2017 (3 pages).

(Continued)

*Primary Examiner* — Lan Dai T Truong
(74) *Attorney, Agent, or Firm* — Barnes & Thornburg LLP

(57) ABSTRACT

Technologies for allocating ephemeral data storage among managed nodes include an orchestrator server to receive ephemeral data storage availability information from the managed nodes, receive a request from a first managed node of the managed nodes to allocate an amount of ephemeral data storage as the first managed node executes one or more workloads, determine, as a function of the ephemeral data storage availability information, an availability of the requested amount of ephemeral data storage, and allocate, in response to a determination that the requested amount of ephemeral data storage is available from one or more other managed nodes, the requested amount of ephemeral data storage to the first managed node as the first managed node executes the one or more workloads. Other embodiments are also described and claimed.

22 Claims, 20 Drawing Sheets

*Data Center 100*

Related U.S. Application Data filed on Aug. 18, 2016, provisional application No. 62/427,268, filed on Nov. 29, 2016.

(51) Int. Cl.

| | |
|---|---|
| H03M 7/40 | (2006.01) |
| G06F 16/901 | (2019.01) |
| G06F 3/06 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/24 | (2006.01) |
| H04L 29/08 | (2006.01) |
| H04L 12/26 | (2006.01) |
| H04L 12/851 | (2013.01) |
| H04Q 11/00 | (2006.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| H04L 12/811 | (2013.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC .............. *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L 49/45* (2013.01);

H04L 49/555 (2013.01); H04L 67/02 (2013.01); H04L 67/10 (2013.01); H04L 67/1004 (2013.01); H04L 67/1008 (2013.01); H04L 67/1012 (2013.01); H04L 67/1014 (2013.01); H04L 67/1029 (2013.01); H04L 67/1034 (2013.01); H04L 67/1097 (2013.01); H04L 67/12 (2013.01); H04L 67/16 (2013.01); H04L 67/306 (2013.01); H04L 67/34 (2013.01); H04L 69/04 (2013.01); H04L 69/329 (2013.01); H04Q 1/04 (2013.01); H04Q 11/00 (2013.01); H04Q 11/0003 (2013.01); H04Q 11/0005 (2013.01); H04Q 11/0062 (2013.01); H04Q 11/0071 (2013.01); H04W 4/023 (2013.01); H05K 1/0203 (2013.01); H05K 1/181 (2013.01); H05K 5/0204 (2013.01); H05K 7/1418 (2013.01); H05K 7/1421 (2013.01); H05K 7/1422 (2013.01); H05K 7/1447 (2013.01); H05K 7/1461 (2013.01); H05K 7/1487 (2013.01); H05K 7/1489 (2013.01); H05K 7/1491 (2013.01); H05K 7/1492 (2013.01); H05K 7/1498 (2013.01); H05K 7/2039 (2013.01); H05K 7/20709 (2013.01); H05K 7/20727 (2013.01); H05K 7/20736 (2013.01); H05K 7/20745 (2013.01); H05K 7/20836 (2013.01); H05K 13/0486 (2013.01); G06F 2209/5019 (2013.01); G06F 2209/5022 (2013.01); G06F 2212/1008 (2013.01); G06F 2212/1024 (2013.01); G06F 2212/1041 (2013.01); G06F 2212/1044 (2013.01); G06F 2212/152 (2013.01); G06F 2212/202 (2013.01); G06F 2212/401 (2013.01); G06F 2212/402 (2013.01); G06F 2212/7207 (2013.01); G06Q 10/087 (2013.01); G06Q 10/20 (2013.01); G06Q 50/04 (2013.01); G08C 2200/00 (2013.01); H04B 10/25 (2013.01); H04L 41/12 (2013.01); H04L 41/5019 (2013.01); H04L 43/065 (2013.01); H04Q 2011/0037 (2013.01); H04Q 2011/0041 (2013.01); H04Q 2011/0052 (2013.01); H04Q 2011/0073 (2013.01); H04Q 2011/0079 (2013.01); H04Q 2011/0086 (2013.01); H04Q 2213/13523 (2013.01); H04Q 2213/13527 (2013.01); H04W 4/80 (2018.02); H05K 7/1485 (2013.01); H05K 2201/066 (2013.01); H05K 2201/10121 (2013.01); H05K 2201/10159 (2013.01); H05K 2201/10189 (2013.01); Y02D 10/14 (2018.01); Y02D 10/151 (2018.01); Y02P 90/30 (2015.11); Y10S 901/01 (2013.01)

(56) References Cited

U.S. PATENT DOCUMENTS

| | | | |
|---|---|---|---|
| 2011/0047190 A1* | 2/2011 | Lee | H04L 67/1095 707/803 |
| 2014/0068197 A1 | 3/2014 | Joshi et al. | |
| 2014/0215173 A1* | 7/2014 | Clark | G06F 12/16 711/162 |
| 2014/0237147 A1* | 8/2014 | Joshi | G06F 12/0866 710/74 |
| 2014/0304398 A1 | 10/2014 | Carlen et al. | |
| 2014/0365661 A1 | 12/2014 | Mallet | |
| 2017/0168878 A1* | 6/2017 | Chandra | G06F 9/542 |

OTHER PUBLICATIONS

Written opinion for PCT application No. PCT/US2017/038150, dated Oct. 17, 2017 (7 pages).

* cited by examiner

TECHNOLOGIES FOR ALLOCATING EPHEMERAL DATA STORAGE AMONG MANAGED NODES

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376859, filed Aug. 18, 2016, and U.S. Provisional Patent Application No. 62/427,268, filed Nov. 29, 2016.

BACKGROUND

In a typical cloud-based computing environment (e.g., a data center), multiple compute nodes may execute workloads (e.g., processes, applications, services, etc.) on behalf of customers. During the execution of the workloads, the amount of data storage capacity to be used for ephemeral data (e.g., cache or other data temporarily used by an application to perform operations) varies with the number and types of workloads executed by each compute node. Typically, such data is local to each compute node, either in one or more local solid state drives (SSD), hard disk drives (HDD), or other local data storage device and may be addressable in blocks (e.g., sets of bytes). To guard against the possibility of having inadequate local data storage for the ephemeral data storage needs of the workloads, each compute node is typically equipped with a fixed amount of data storage capacity to meet the peak amount that may occasionally be requested by the workloads. However, given the variations in the ephemeral data storage needs of the workloads as they are executed, the capacity of the local data storage devices may go unused for a significant percentage of the time, resulting in wasted resources in the data center.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
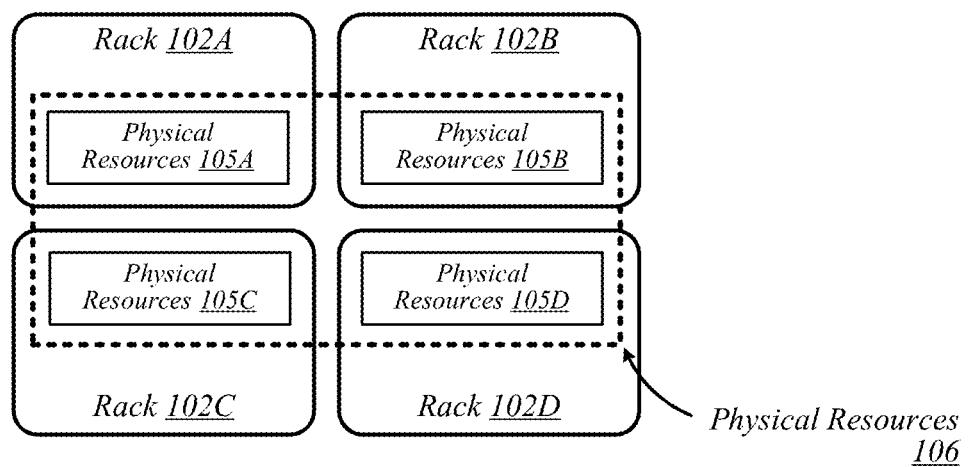
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
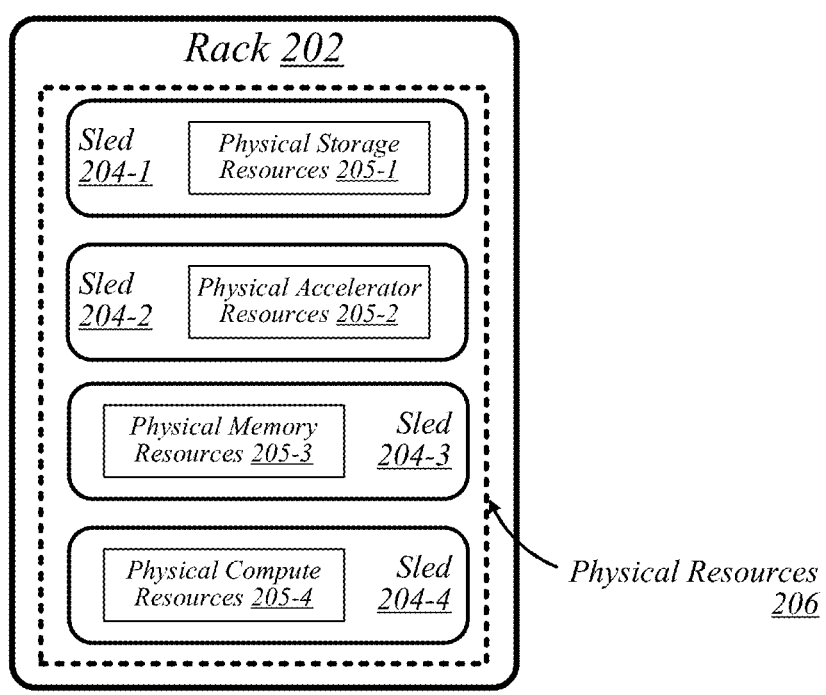
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
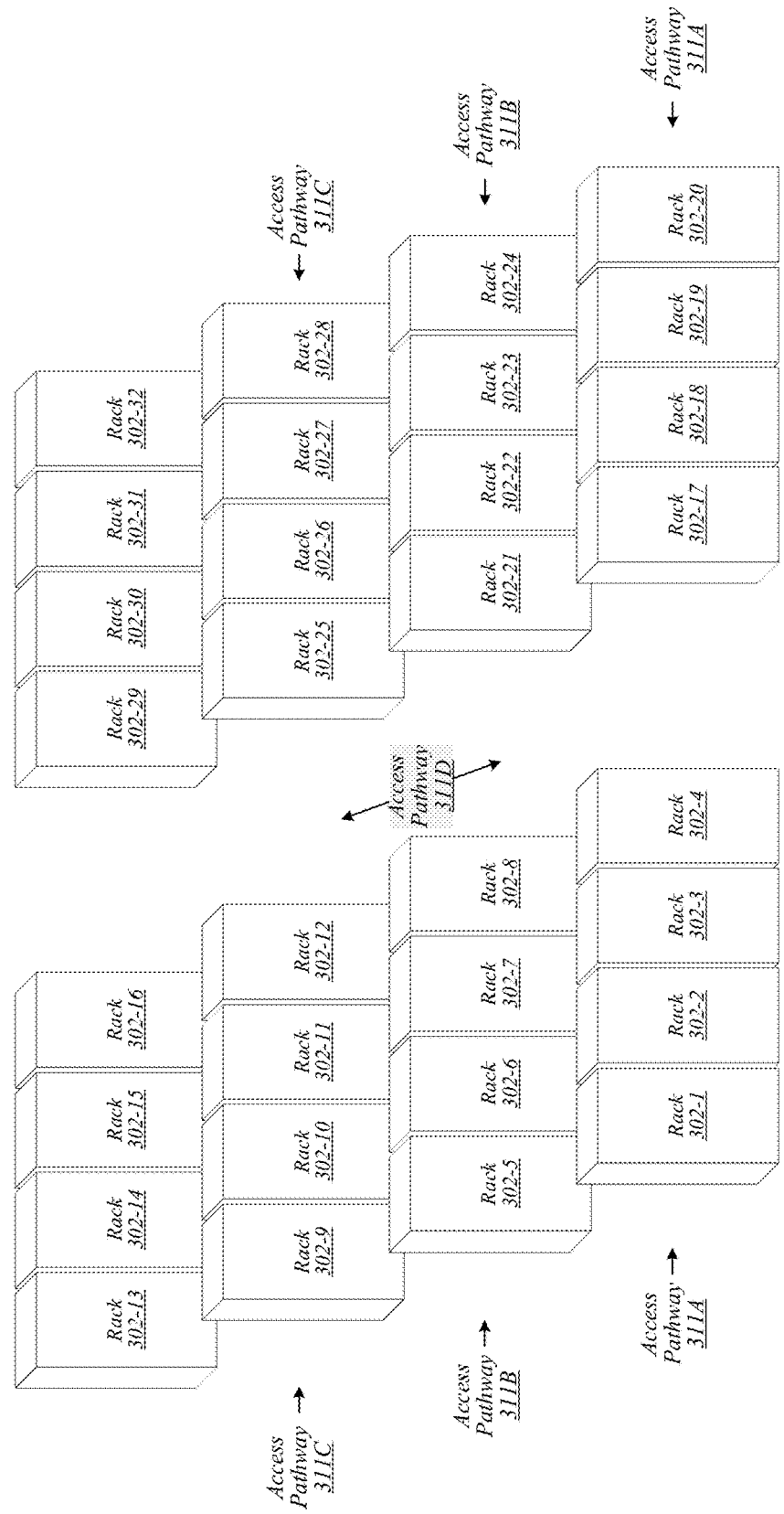
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
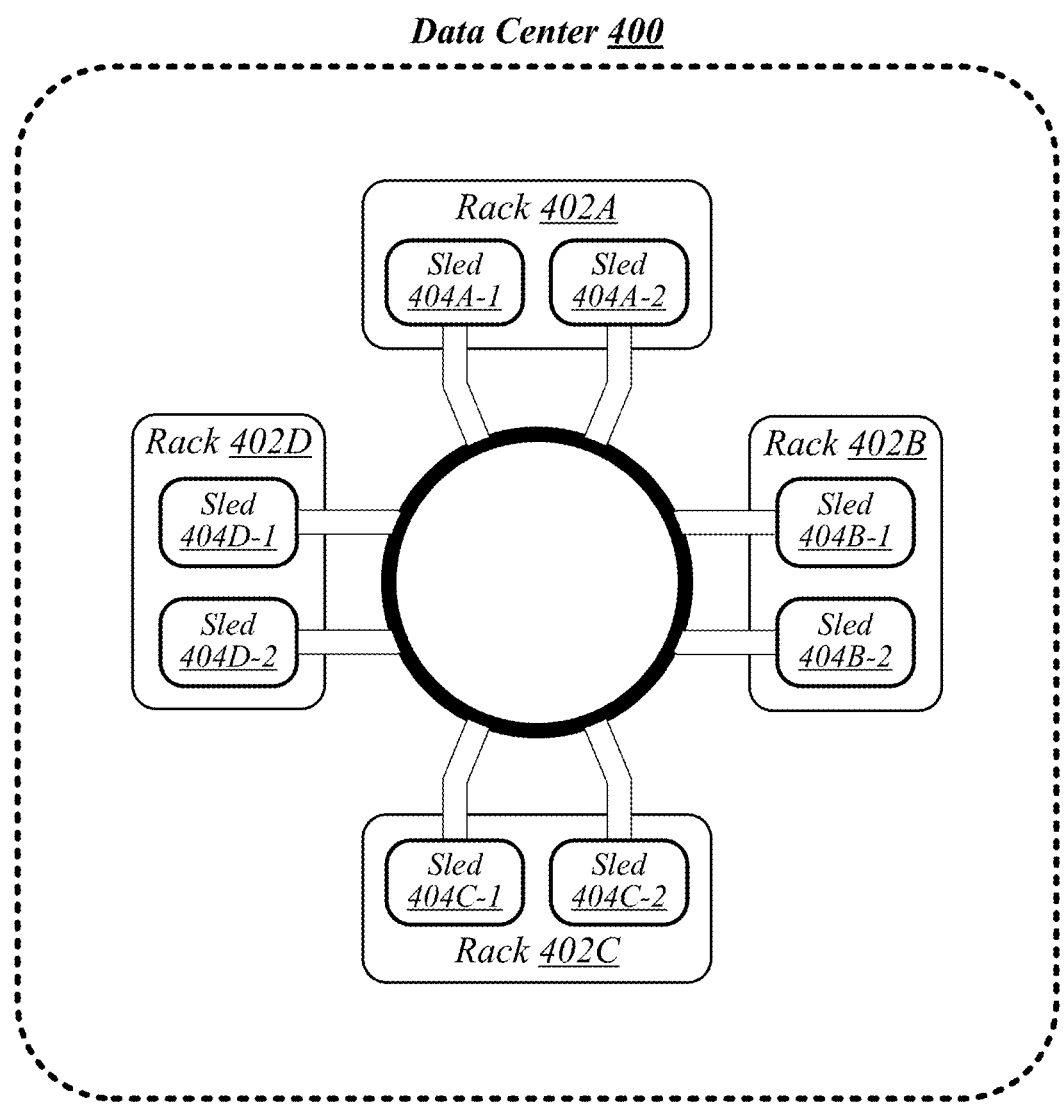
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
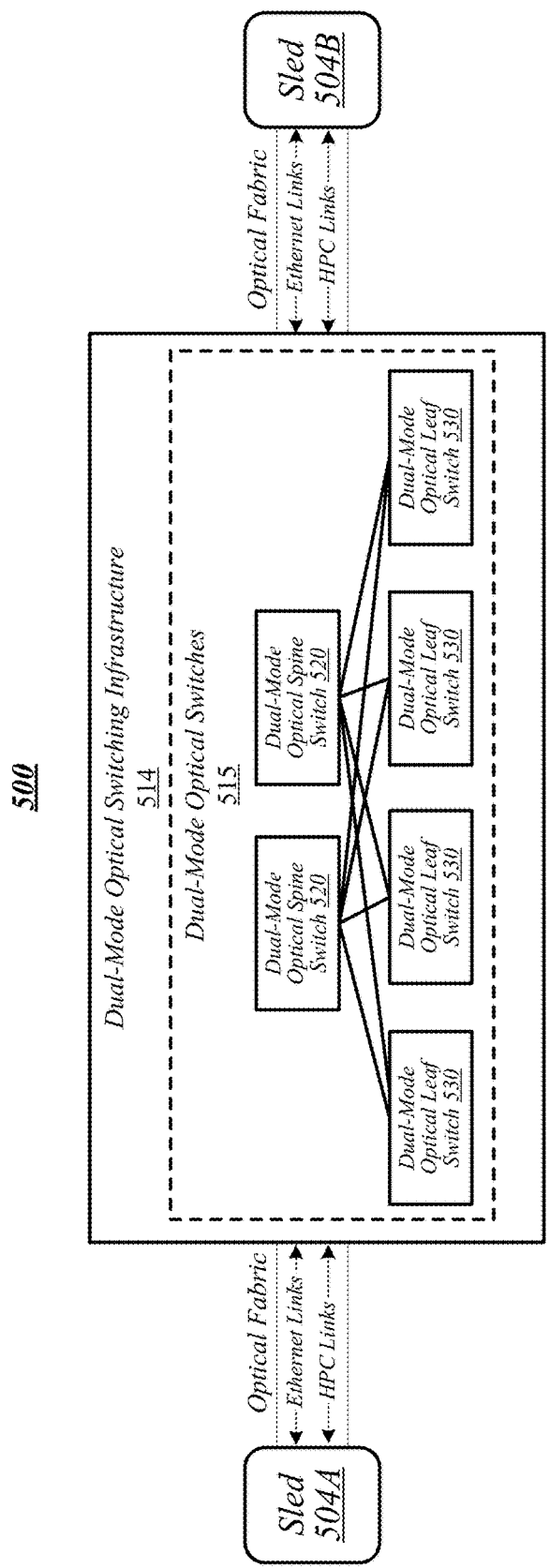
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
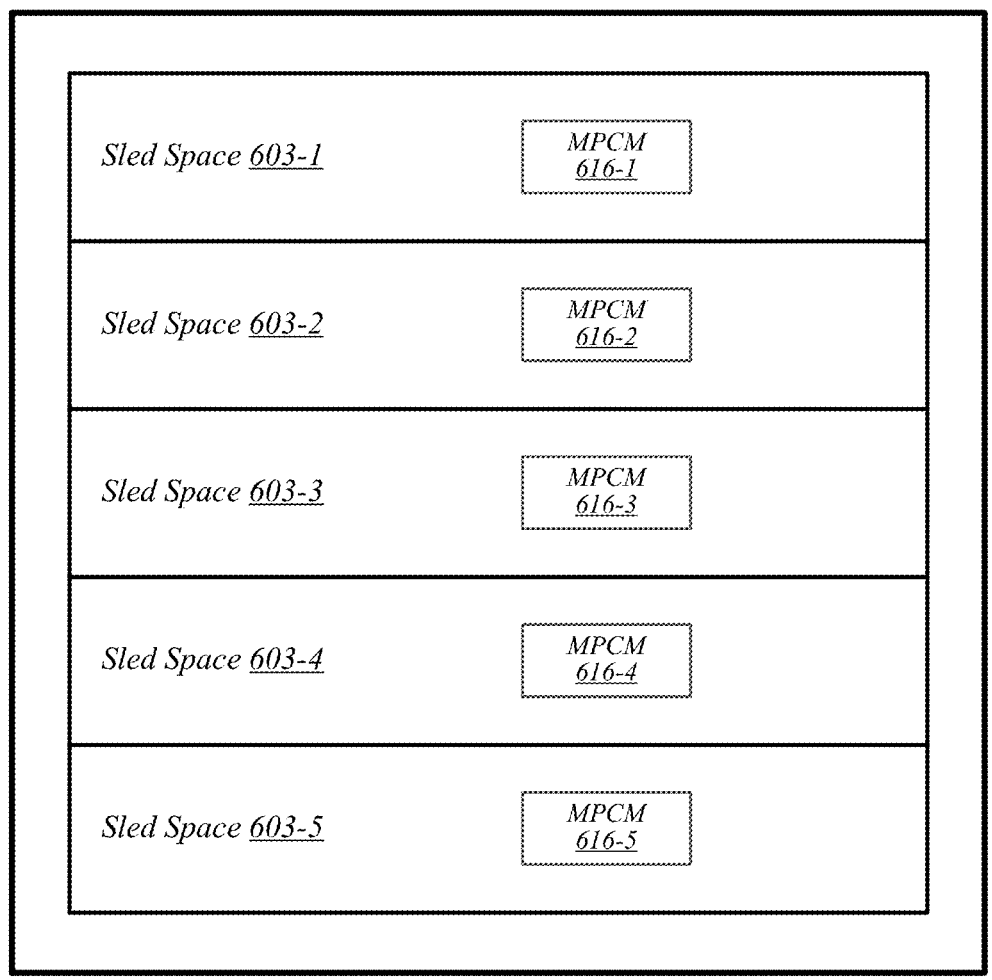
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
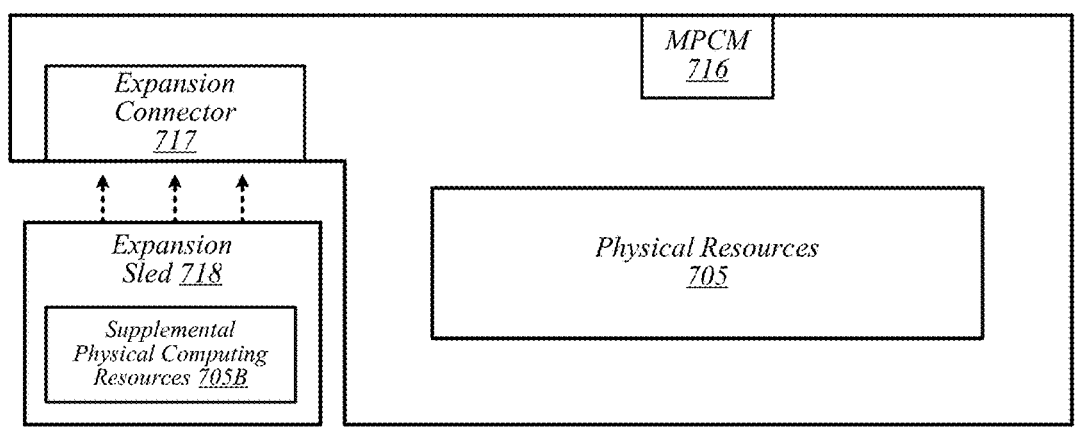
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
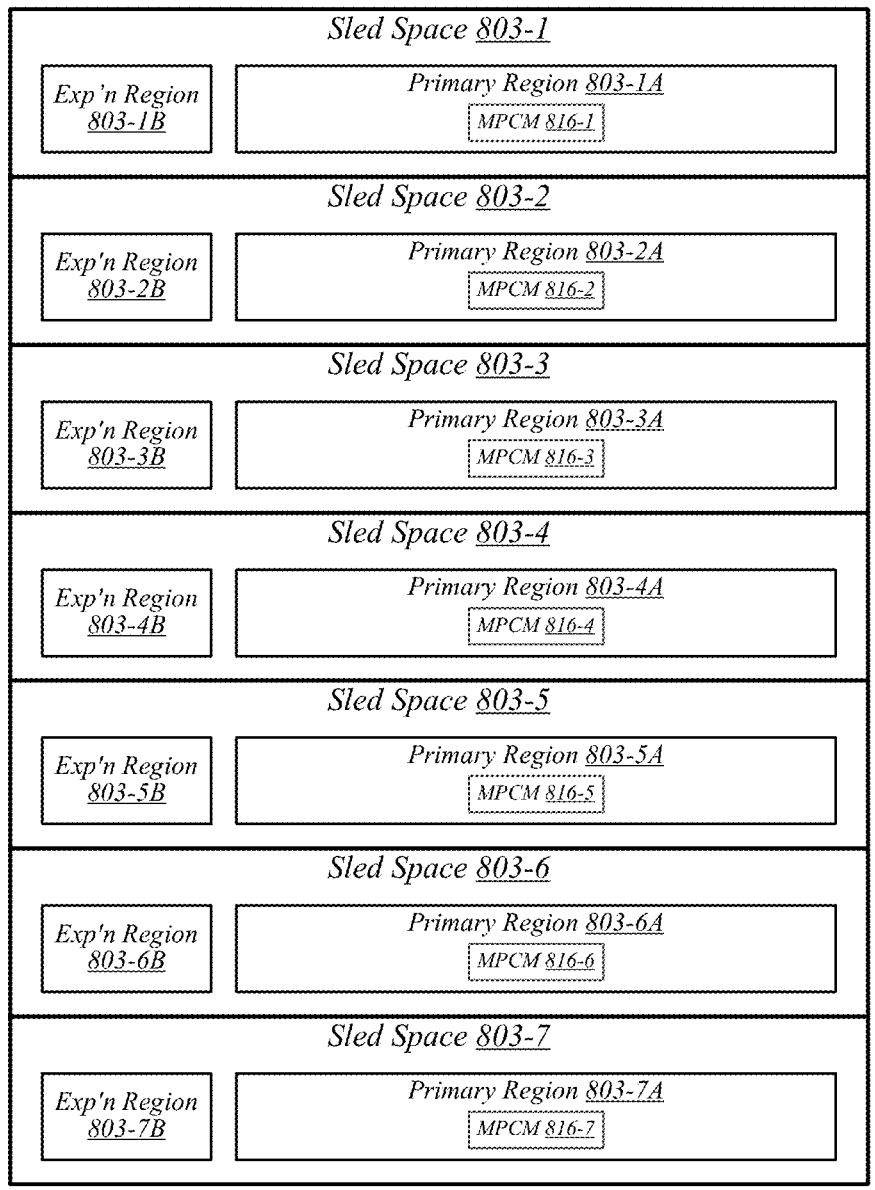
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
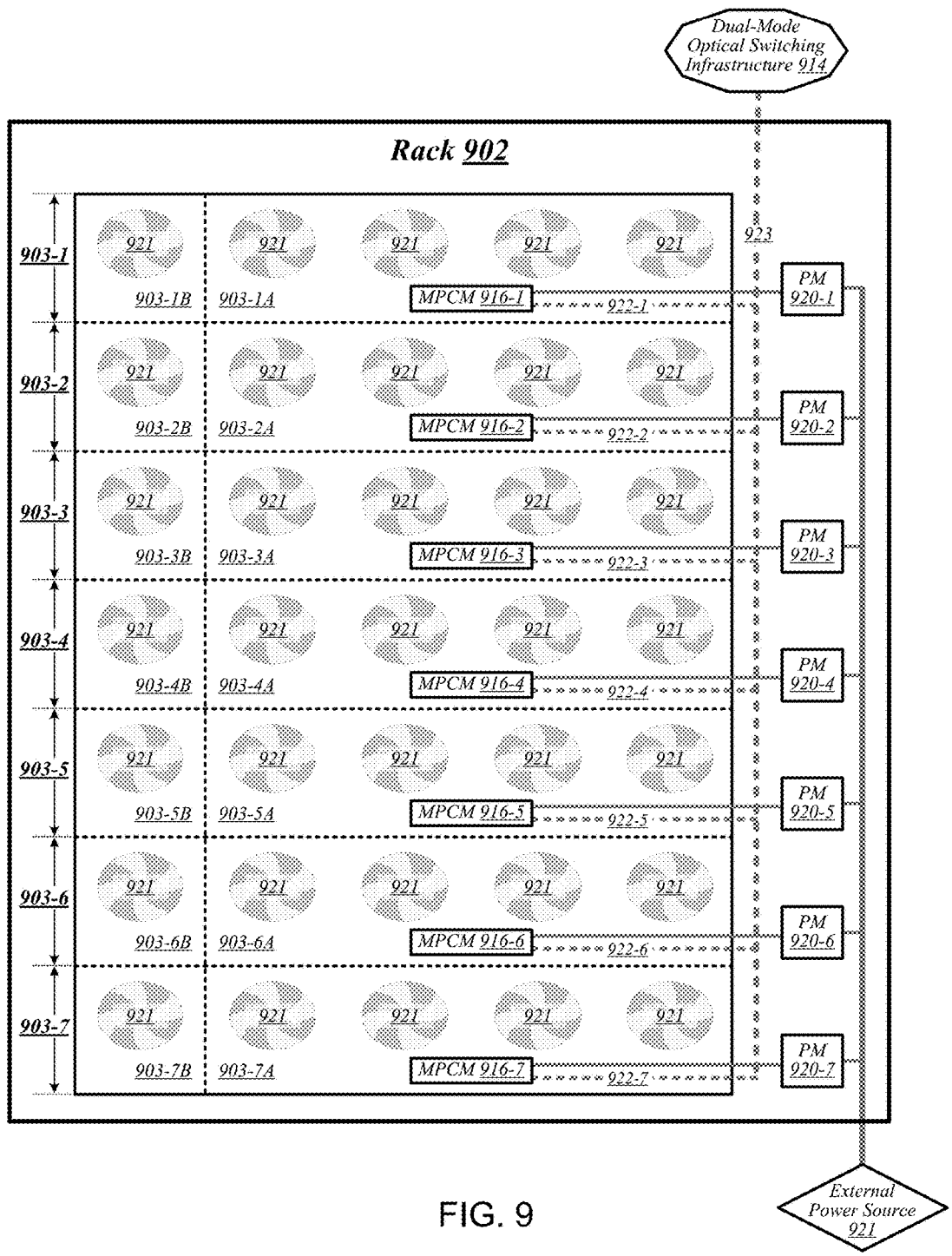
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
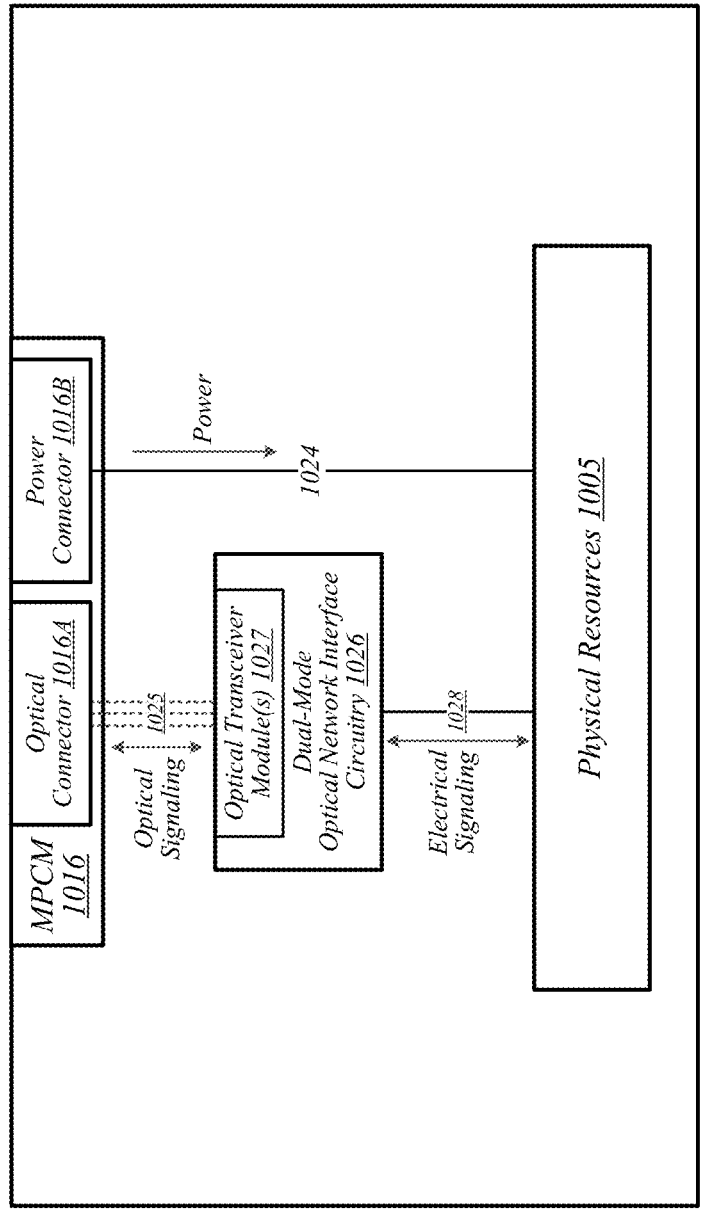
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
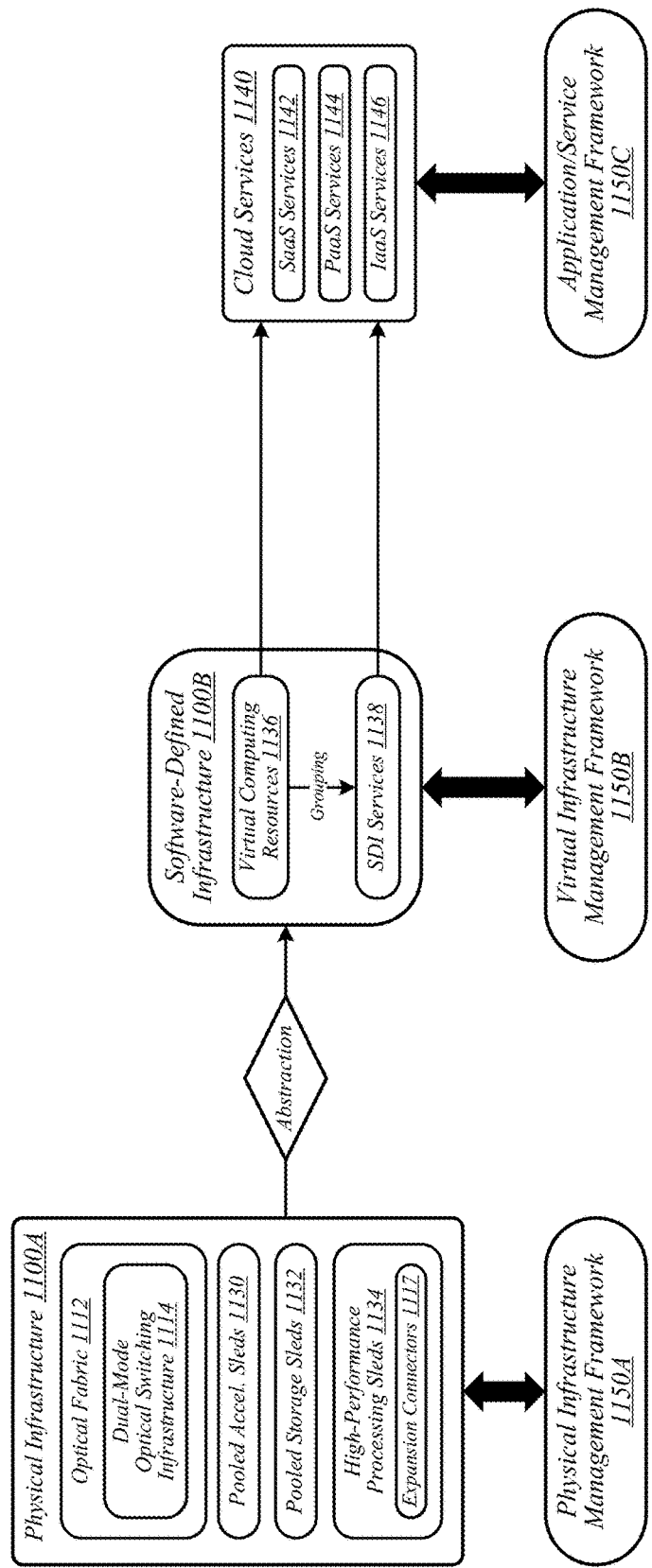
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to— optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
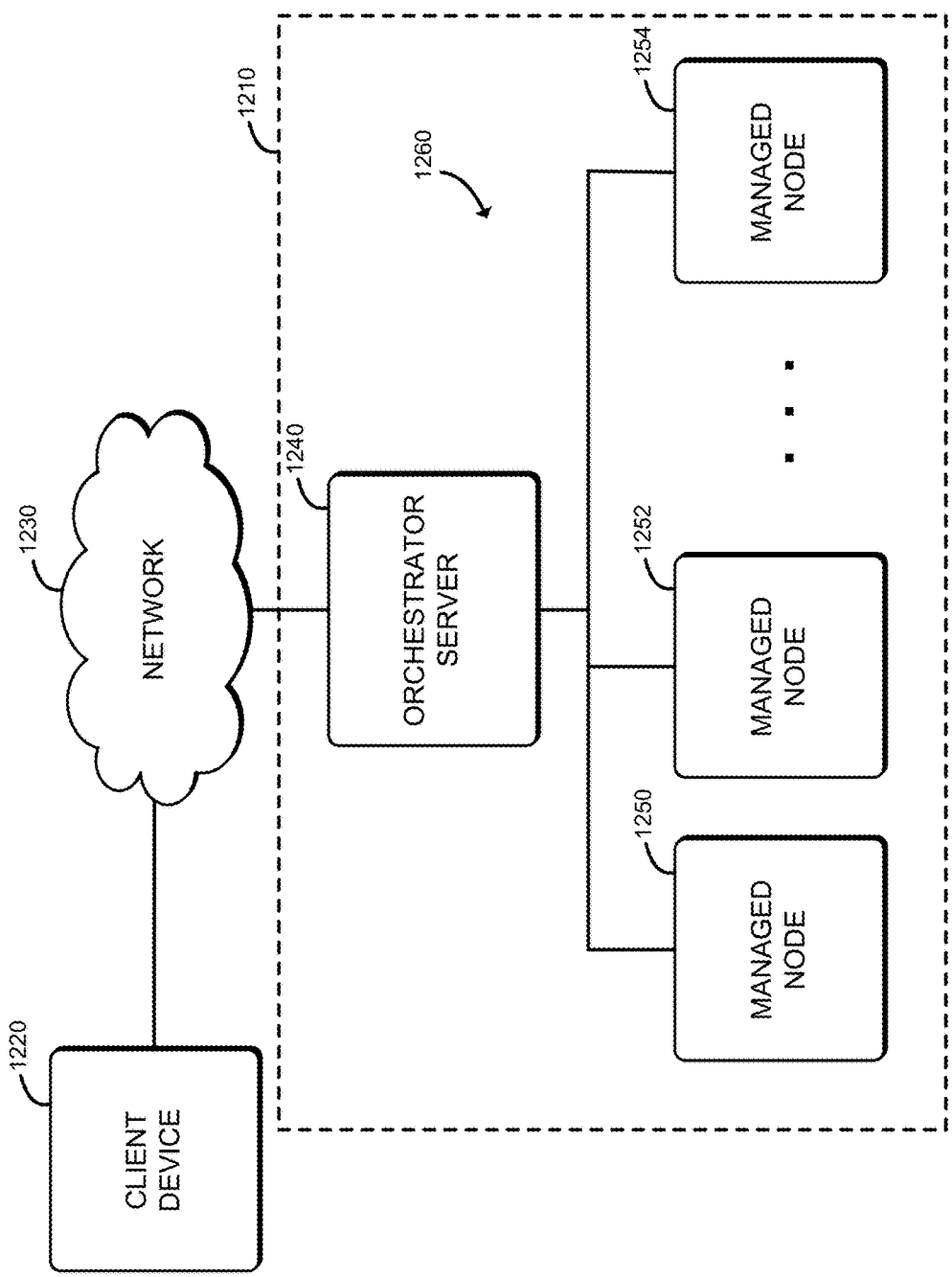
FIG. 12 is a simplified block diagram of at least one embodiment of a system for managing the allocation of ephemeral data storage among a set of managed nodes on an as-requested basis.

As shown in FIG. 12, an illustrative system 1210 for managing the allocation of ephemeral data storage among a set of managed nodes 1260 on an as-requested basis includes an orchestrator server 1240 in communication with the set of managed nodes 1260. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and the managed nodes 1250 may execute one or more applications or processes (i.e., workloads), such as in virtual machines or containers, on behalf of a user of the client device 1220.

As discussed in more detail herein, the managed nodes 1260 may request the allocation of ephemeral data storage from other managed nodes 1260 in the system 1210 as the workloads are being performed, and later deallocate all or a portion of the allocated storage, to free up the storage for use by other managed nodes 1260. Due to the architecture described above, the managed nodes 1260 may treat the allocated ephemeral data storage as if it is local, such as by allocating blocks of ephemeral data storage and addressing the blocks with write and read operations as if the blocks of data storage were local (e.g., physically located on the sled of the managed node 1260). Some of the managed nodes 1260 may be equipped with more ephemeral data storage than others, and in some embodiments, one or more of the managed nodes 1260 may be equipped with no local ephemeral data storage and be reliant on the other managed nodes 1260 to provide ephemeral data storage on an as needed basis. For example, the managed node 1250 may be similar to the sled 204-4 of FIG. 2, with physical compute resource and little or no physical storage resources, while the managed nodes 1252 and 1254 may be similar to sled 204-1 of FIG. 2, and be equipped with a relatively large amount of physical data storage resources 205-1. In the illustrative embodiment, the orchestrator server 1240 is configured to track the availability of blocks of ephemeral data storage among the managed nodes 1260, receive requests for the allocation of ephemeral data storage, determine which managed nodes have available ephemeral data storage to allocate in response to the request, and send messages to one or more of the managed nodes 1260 to allocate ephemeral data storage in fulfillment of the request. In other embodiments, the managed nodes 1260 are configured to communicate directly to coordinate the allocation and deallocation of ephemeral data storage among them, as the workloads are performed.

Figure 13:
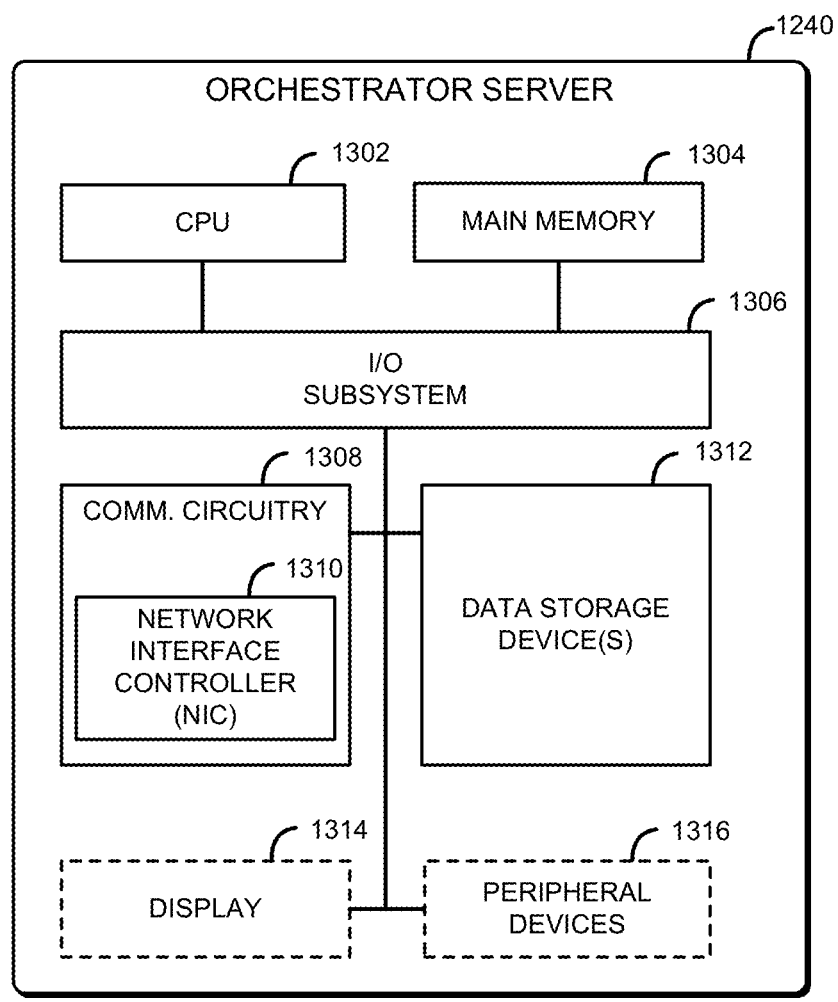
FIG. 13 is a simplified block diagram of at least one embodiment of an orchestrator server of the system of FIG. 12.

Referring now to FIG. 13, the orchestrator server 1240 may be embodied as any type of compute device capable of performing the functions described herein, including issuing a request to have cloud services performed, receiving results of the cloud services, assigning workloads to compute devices, and managing the allocation of ephemeral data storage among the managed nodes 1260. For example, the orchestrator server 1240 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative orchestrator server 1240 includes a central processing unit (CPU) 1302, a main memory 1304, an input/output (I/O) subsystem 1306, communication circuitry 1308, and one or more data storage devices 1312. Of course, in other embodiments, the orchestrator server 1240 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. As discussed above, the managed node 1260 may include resources distributed across multiple sleds and in such embodiments, the CPU 1302 may include portions thereof located on the same sled or different sled. Similarly, the main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation, such as a map of the allocation of ephemeral data storage among the managed nodes, ephemeral data, operating systems, applications, programs, libraries, and drivers. As discussed above, the managed node 1260 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the orchestrator server 1240. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the orchestrator server 1240, on a single integrated circuit chip.

The communication circuitry 1308 may be embodied as any communication circuit, device, or collection thereof, capable of enabling communications over the network 1230 between the orchestrator server 1240 and another compute device (e.g., the client device 1220, and/or the managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughtercards, network interface cards, controller chips, chipsets, or other devices that may be used by the orchestrator server 1240 to connect with another compute device (e.g., the client device 1220 and/or the managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a local processor (not shown) and/or a local memory (not shown) that are both local to the NIC 1310. In such embodiments, the local processor of the NIC 1310 may be capable of performing one or more of the functions of the CPU 1302 described herein. Additionally or alternatively, in such embodiments, the local memory of the NIC 1310 may be integrated into one or more components of the orchestrator server 1240 at the board level, socket level, chip level, and/or other levels. As discussed above, the managed node 1260 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

Additionally, the orchestrator server 1240 may include a display 1314. The display 1314 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1314 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the orchestrator server 1240 may include one or more peripheral devices 1316. Such peripheral devices 1316 may include any type of peripheral device commonly found in a compute device such as speakers, a mouse, a keyboard, and/or other input/output devices, interface devices, and/or other peripheral devices.

The client device 1220 and the managed nodes 1260 may have components similar to those described in FIG. 13. The description of those components of the orchestrator server 1240 is equally applicable to the description of components of the client device 1220 and the managed nodes 1260 and is not repeated herein for clarity of the description. Further, it should be appreciated that any of the client device 1220 and the managed nodes 1260 may include other components, sub-components, and devices commonly found in a computing device, which are not discussed above in reference to the orchestrator server 1240 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
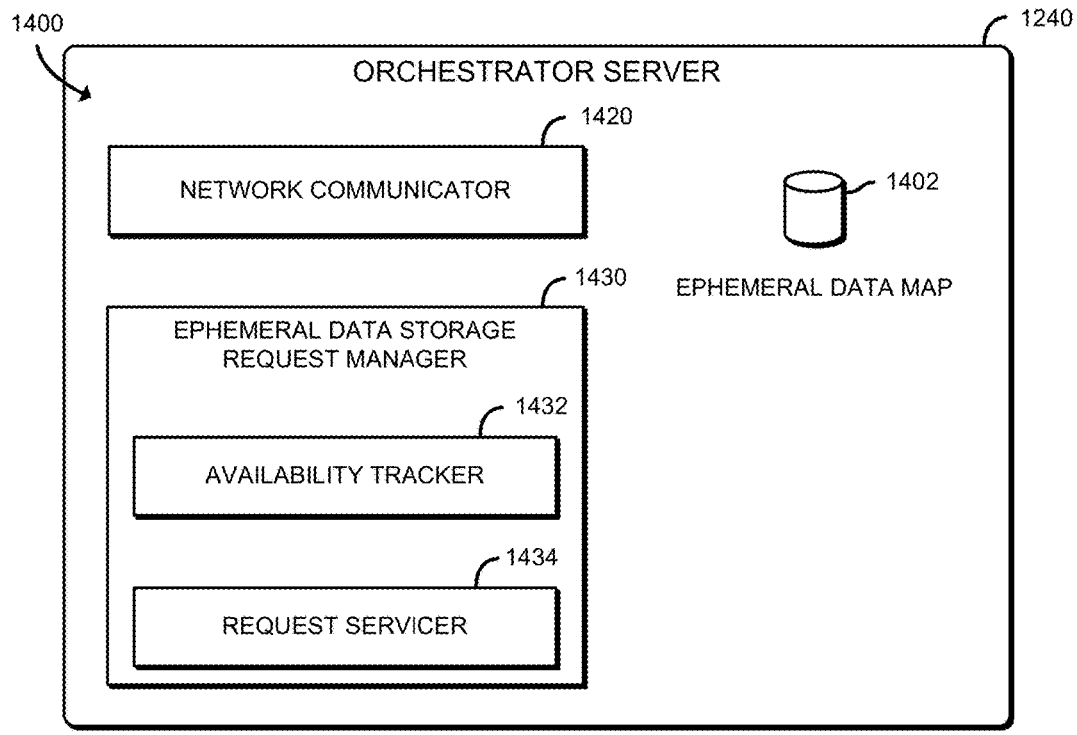
FIG. 14 is a simplified block diagram of at least one embodiment of an environment that may be established by the orchestrator server of FIGS. 12 and 13.

Referring now to FIG. 14, in the illustrative embodiment, the orchestrator server 1240 may establish an environment 1400 during operation. The illustrative environment 1400 includes a network communicator 1420 and an ephemeral data storage request manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, ephemeral data storage request manager circuitry 1430, etc.). It should be appreciated that, in such embodiments, one or more of the network communicator circuitry 1420 or the ephemeral data storage request manager circuitry 1430 may form a portion of one or more of the CPU 1302, the main memory 1304, the I/O subsystem 1306, the communication circuitry 1308, and/or other components of the orchestrator server 1240. In the illustrative embodiment, the environment 1400 includes an ephemeral data map 1402 which may be embodied as any data indicative of the availability of ephemeral data storage among the managed nodes 1260, such as amounts of available ephemeral data storage in each managed node 1260, addresses of the blocks of the ephemeral data storage, associations between the managed node 1260 that is using each allocated block of ephemeral data storage and the managed node 1260 that physically includes those blocks of ephemeral data storage, and types of ephemeral data storage. In the illustrative embodiment, the type of the ephemeral data storage may be embodied as any data indicative of the performance (e.g., read time, write time, seek time, bandwidth, input/output instructions per second, etc.) of the underlying data storage device (also referred to herein as data storage medium) that has the ephemeral data storage. The different types of data storage devices to provide the different types of ephemeral data storage may be solid state drives (SSDs), hard disk drives (HDDs), dual in-line memory modules, processor caches, and/or other memory devices.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1240, respectively. To do so, the network communicator 1420 is configured to receive and process data packets from one system or computing device (e.g., the client device 1220) and to prepare and send data packets to another computing device or system (e.g., the managed nodes 1260). Accordingly, in some embodiments, at least a portion of the functionality of the network communicator 1420 may be performed by the communication circuitry 1308, and, in the illustrative embodiment, by the NIC 1310.

The ephemeral data storage request manager 1430, which may be embodied as hardware, firmware, software, virtualized hardware, emulated architecture, and/or a combination thereof as discussed above, is configured to monitor the allocation of ephemeral data storage among the managed nodes 1260 and respond to requests from the managed nodes 1260 to allocate ephemeral data storage as the workloads are executed. To do so, in the illustrative embodiment, the ephemeral data storage request manager 1430 includes an availability tracker 1432 and a request servicer 1434. In the illustrative embodiment, the availability tracker 1432 is configured to receive update messages from the managed nodes 1260 as ephemeral data storage is allocated and/or deallocated and update the ephemeral data map 1402 to reflect the changes in the allocation of the ephemeral data across the managed nodes 1260.

The request servicer 1434, in the illustrative embodiment, is configured to receive a request from a managed node 1260 to allocate ephemeral data storage, analyze the ephemeral data map 1402 to identify a set (e.g., one or more) managed nodes 1260 having the ephemeral data storage to fulfill the request, and send a notification to the set of managed nodes 1260 to allocate the requested ephemeral data storage. The request servicer 1434, in operation, may then send a message back to the requestor managed node 1260 (i.e., the managed node 1260 that sent the request) with information about the allocated ephemeral data storage, including the amount of allocated storage, the addresses of the blocks of ephemeral data storage (e.g., a combination of a unique address of the managed node 1260 equipped with the ephemeral data storage, such as a media access control (MAC) address, and a data storage address of each block within that managed node 1260), and the type (e.g., performance characteristics) of the allocated ephemeral data storage. It should be appreciated that each of the availability tracker 1432 and the request servicer 1434 may be separately embodied as hardware, firmware, software, virtualized hardware, emulated architecture, and/or a combination thereof. For example, the availability tracker 1432 may be embodied as a hardware component, while the request servicer 1434 is embodied as virtualized hardware components or as some other combination of hardware, firmware, software, virtualized hardware, emulated architecture, and/or a combination thereof.

Figure 15:
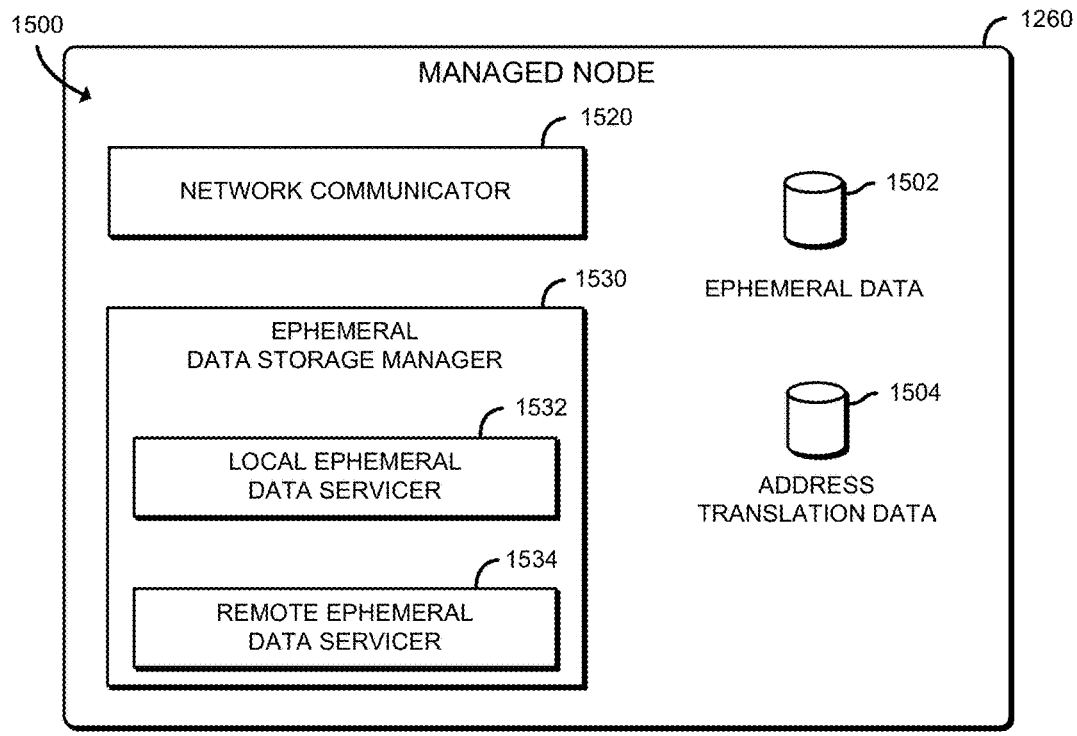
FIG. 15 is a simplified block diagram of at least one embodiment of an environment that may be established by a managed node of FIG. 12.

Referring now to FIG. 15, in the illustrative embodiment, each managed node 1260 may establish an environment 1500 during operation. The illustrative environment 1500 includes a network communicator 1520 and an ephemeral data storage manager 1530. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, ephemeral data storage manager circuitry 1530, etc.). It should be appreciated that, in such embodiments, one or more of the network communicator circuitry 1520 or the ephemeral data storage manager circuitry 1530 may form a portion of one or more of the CPU 1302, the main memory 1304, the I/O subsystem 1306, the communication circuitry 1308, and/or other components of the managed node 1260. In the illustrative embodiment, the environment 1500 includes ephemeral data 1502 which may be embodied as any temporary data (e.g., cache) used by the managed node 1260 during the execution of the workloads. A portion of the ephemeral data 1502 may be physically local to the managed node 1260 while another portion may be remotely located (e.g., allocated on one or more other managed nodes 1260) and mapped to local data storage addresses (e.g., logical block addresses) of the managed node 1260. The environment 1500 also includes, in the illustrative embodiment, address translation data 1504 which may be embodied as any data indicative of a map between local data storage addresses of the managed node 1260 and addresses of remotely located ephemeral data storage. As described with reference to FIG. 14, the addresses of the remotely located ephemeral data storage may be embodied as a combination of a unique address of the remote managed node 1260, such as a MAC address, and the internal (e.g., local) address of the ephemeral data storage (e.g., a logical block address) within that remote managed node 1260. As such, as read and write requests are issued by workloads executed by the managed node 1260, the managed node 1260 may translate addresses included in the read or write requests to addresses of remotely located ephemeral data storage by looking up the corresponding addresses in the address translation data 1504.

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1260, respectively. To do so, the network communicator 1520 is configured to receive and process data packets from one system or computing device (e.g., the orchestrator server 1240 or another managed node 1260) and to prepare and send data packets to another computing device or system (e.g., the orchestrator server 1240 or another managed node 1260). Accordingly, in some embodiments, at least a portion of the functionality of the network communicator 1520 may be performed by the communication circuitry 1308, and, in the illustrative embodiment, by the NIC 1310.

The ephemeral data storage manager 1530, which may be embodied as hardware, firmware, software, virtualized hardware, emulated architecture, and/or a combination thereof as discussed above, is configured to receive requests to allocate, deallocate, read, and/or write to ephemeral data storage, which may be local to the managed node 1260 and/or remote from the managed node 1260, as described above. To do so, in the illustrative embodiment, the ephemeral data storage manager 1530 includes a local ephemeral data servicer 1532 and a remote ephemeral data servicer 1534. In the illustrative embodiment, the local ephemeral data servicer 1532 is configured to write to, read from, allocate, and deallocate ephemeral data storage that is local to the managed node 1260 on behalf of the managed node 1260 itself or another managed node 1260. As such, in the illustrative embodiment, the local ephemeral data servicer 1532 is configured to respond to messages from the orchestrator server 1240 to allocate local ephemeral data storage for another managed node 1260, or from the other managed node 1260 itself and likewise is configured to deallocate local ephemeral data storage in response to a message to do so. The remote ephemeral data servicer 1534 is configured to request the allocation or deallocation of ephemeral data storage on a remote managed node 1260, such as when the local ephemeral data storage, if any, is inadequate for the workloads presently executed by the managed node 1260. After the ephemeral data storage is allocated on a remote managed node 1260, the remote ephemeral data servicer 1534 is configured to redirect read and/or write requests from workloads executed on the managed node 1260 to the remotely-located ephemeral data storage using the address translation data 1504 as described above. It should be appreciated that each of the local ephemeral data servicer 1532 and the remote ephemeral data servicer 1534 may be separately embodied as hardware, firmware, software, virtualized hardware, emulated architecture, and/or a combination thereof. For example, the local ephemeral data servicer 1532 may be embodied as a hardware component, while the remote ephemeral data servicer 1534 is embodied as virtualized hardware components or as some other combination of hardware, firmware, software, virtualized hardware, emulated architecture, and/or a combination thereof.

Figure 16:
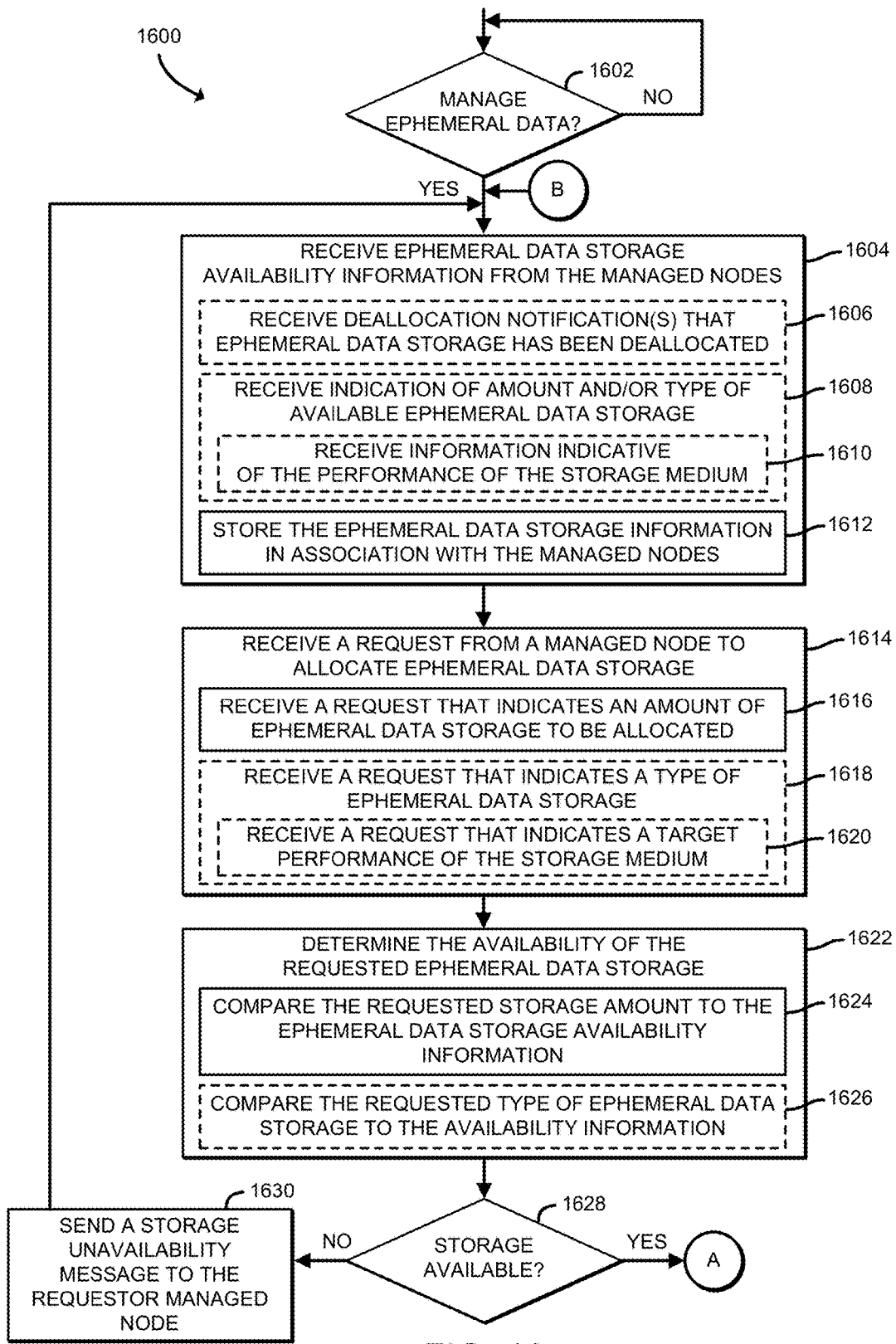
FIGS. 16-17 are a simplified flow diagram of at least one embodiment of a method for managing the allocation of ephemeral data storage among a set of managed nodes that may be performed by the orchestrator server of FIGS. 12-14.

Referring now to FIG. 16, in use, the orchestrator server 1240 may execute a method 1600 for managing the allocation of ephemeral data storage among the managed nodes 1260 as the workloads are executed. The method 1600 begins with block 1602, in which the orchestrator server 1240 determines whether to manage ephemeral data. In the illustrative embodiment, the orchestrator server 1240 determines to manage ephemeral data if the orchestrator server 1240 is powered on, in communication with the managed nodes 1260, and has received at least one request from the client device 1220 to provide cloud services (i.e., to perform one or more workloads). In other embodiments, the orchestrator server 1240 may determine whether to manage ephemeral data based on other factors. Regardless, in response to a determination to manage ephemeral data, in the illustrative embodiment, the method 1600 advances to block 1604 in which the orchestrator server 1240 receives ephemeral data storage availability information from the managed nodes 1260. The orchestrator server 1240 may actively poll the managed nodes 1260 for the ephemeral data storage availability information, such as on a periodic basis, or may receive the ephemeral data storage availability information based on events occurring within each managed node (e.g., a change in the availability of ephemeral data storage, the expiration of a periodic timer, etc.). In doing so, the orchestrator server 1240 may receive one or more deallocation notifications indicating that ephemeral data storage has been deallocated from one or more of the managed nodes 1260 and is now available to be re-allocated, as indicated in block 1606. In receiving the ephemeral data storage availability information, the orchestrator server 1240 may additionally or alternatively receive an indication of the amount and/or type of the available ephemeral data storage from the managed nodes 1260, as indicated in block 1608. As described above and as indicated in block 1610, in receiving information about the type of available ephemeral data storage, the orchestrator server 1240 may receive information about the performance of the underlying data storage medium. For example, some solid state drives or other data storage devices with available capacity may have lower latency and/or higher bandwidth than other data storage devices. Further, in the illustrative embodiment and as indicated in block 1612, the orchestrator server 1240 stores the ephemeral data storage availability information in association with the managed nodes 1260, such as in the ephemeral data map 1402 described with reference to FIG. 14.

As indicated in block 1614, the orchestrator server 1240 receives a request from a managed node 1260 to allocate ephemeral data storage. In doing so, the orchestrator server 1240 receives a request that indicates the amount of ephemeral data storage to be allocated (e.g., a number of blocks, a total number of bytes, etc.), as indicated in block 1616. Further, as indicated in block 1618, the orchestrator server 1240 may receive a request that also indicates a requested type of ephemeral data storage. In doing so, as indicated in block 1620, the orchestrator server 1240 may receive a request that indicates a target (i.e., requested) performance of the storage medium that is to provide the ephemeral data storage. For example, a managed node 1260 that is executing a workload that makes relatively frequent read and write accesses to the ephemeral data, such as a data encryption workload, may request a higher performance than a managed node that is executing a workload that makes less frequent access to ephemeral data.

Subsequent to receiving a request to allocate ephemeral data storage, the method 1600 advances to block 1622, in which the orchestrator server 1240 determines the availability of the requested ephemeral data storage. In doing so, as indicated in block 1624, the orchestrator server 1240 compares the requested amount of ephemeral data storage to the ephemeral data storage availability information received in block 1604. As described above, in the illustrative embodiment, the received ephemeral data storage availability information is stored in the ephemeral data map 1402. In comparing the requested amount to the ephemeral data storage availability information, the orchestrator server 1240, in the illustrative embodiment, determines whether the managed nodes 1260, as a whole, have the requested amount of ephemeral data storage available (e.g., a portion of the requested amount may be available on one managed node 1260 and another portion of the requested amount may be available on another one of the managed nodes 1260). Further, as indicated in block 1626, the orchestrator server 1240 may also compare the requested type of ephemeral data storage to the ephemeral data storage availability information to determine whether the requested type of ephemeral data storage is available on the managed nodes 1260.

In block 1628, the orchestrator server 1240 determines whether the requested storage is available, based on the determinations and comparisons made in block 1622. If not, method 1600 advances to block 1630 in which the orchestrator server 1240 sends a storage unavailability message to the managed node 1260 that originally sent the request (the "requestor managed node"), indicating that the requested ephemeral data storage is unavailable, and the method 1600 subsequently loops back to block 1604 in which the orchestrator server 1240 again receives ephemeral data storage availability information from the managed nodes 1260. Referring back to block 1628, if the orchestrator server 1240 instead determines that the requested ephemeral data storage is available, the method 1600 advances to block 1632 of FIG. 17 to allocated the requested ephemeral data storage.

Figure 17:
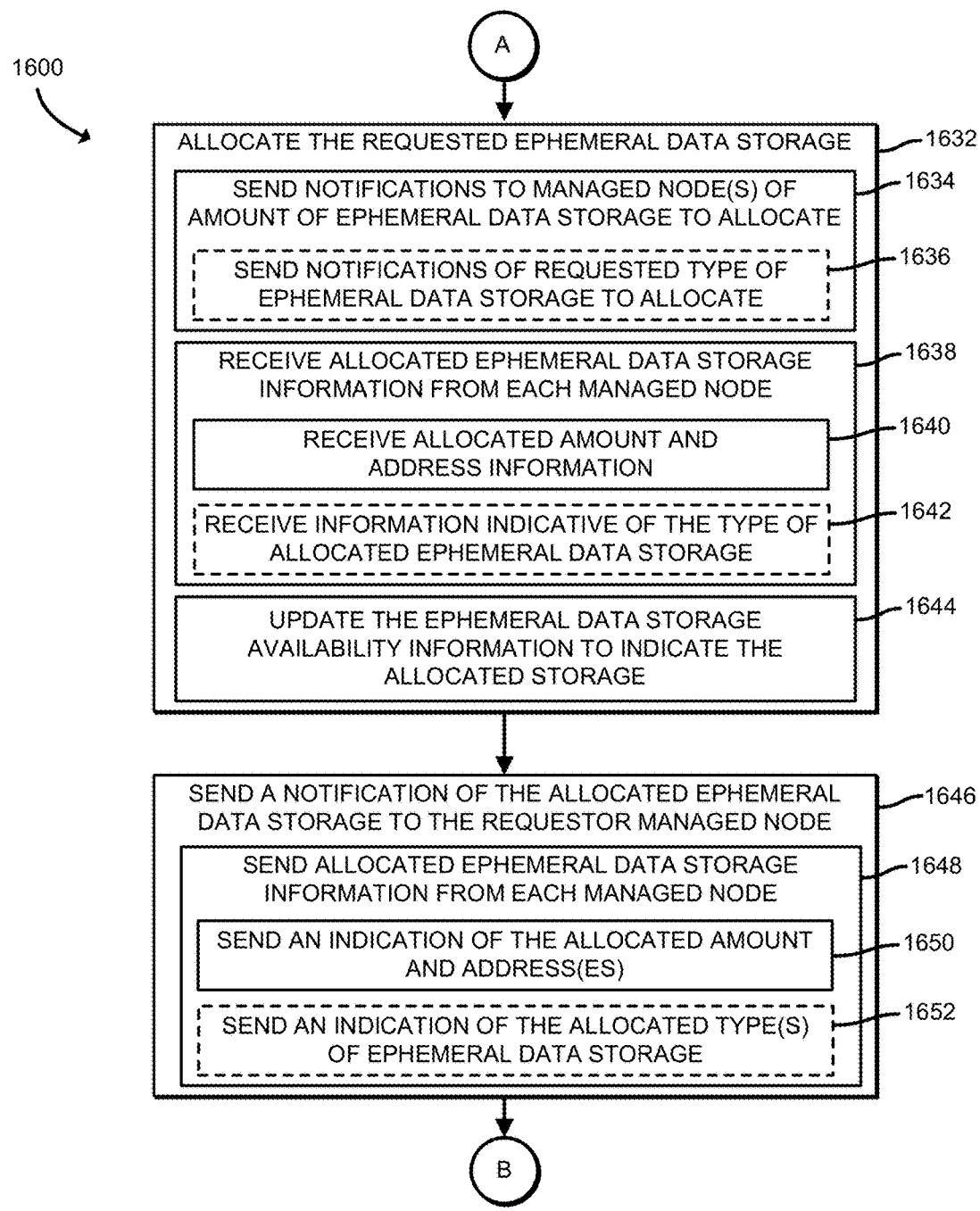

Referring now to FIG. 17, as indicated in block 1634, in allocating the requested ephemeral data storage, the orchestrator server 1240 sends a notification to one or more of the managed nodes 1260 (e.g., the managed nodes 1260 that, together, have sufficient available data storage to satisfy the request). The notification includes the amount of ephemeral data storage each managed node 1260 is to allocate. Further, in sending the notification to the managed nodes 1260, the orchestrator server 1240 may indicate, in the notification, the requested type of ephemeral data storage to allocate (e.g., the target performance characteristics of the data storage medium), as shown in block 1636. Additionally, as indicated in block 1638, in allocating the requested ephemeral data storage, the orchestrator server 1240 receives allocated ephemeral data storage information from each of the managed nodes 1260 that the orchestrator server 1240 sent the notifications to in block 1634. In doing so, as indicated in block 1640, the orchestrator server 1240 receives an indication of the allocated amount of ephemeral data storage and the addresses (e.g., logical block addresses) of the allocated ephemeral data storage in each managed node 1260. Further, the orchestrator server 1240 may receive information indicative of the type of allocated ephemeral data storage allocated by each managed node 1260, as shown in block 1642. In block 1644, the orchestrator server 1240 updates the ephemeral data storage availability information to indicate the allocated ephemeral data storage among the managed nodes 1260, as indicated in block 1644. In doing so, the orchestrator server 1240, in the illustrative embodiment, stores the updated information in the ephemeral data map 1402 (FIG. 14), including the addresses (e.g., logical block addresses) of the allocated ephemeral data storage in combination with the unique addresses (e.g., MAC addresses, etc.) of the corresponding managed nodes 1260 where the ephemeral data storage is physically located.

Subsequent to allocating the requested ephemeral data storage, the method 1600 advances to block 1646 in which the orchestrator server 1240 sends a notification of the allocated ephemeral data storage to the requestor managed node 1260 (i.e., the managed node 1260 that sent the request in block 1614). In doing so, the orchestrator server 1240 sends the allocated ephemeral data storage information to the requestor managed node 1260, as indicated in block 1648. In sending the allocated ephemeral data storage information, the orchestrator server 1240 sends an indication of the allocated amount of ephemeral data storage and the addresses (e.g., combinations of the unique identifiers of the managed nodes 1260 and the addresses of the ephemeral data storage blocks within those managed nodes 1260 (e.g., logical block addresses) to the requestor managed node 1260, as indicated in block 1650. Further, as indicated in block 1652, the orchestrator server 1240 may send an indication of the allocated type or types of ephemeral data storage. The type information may be included in embodiments in which the requested type of ephemeral data storage is optional, such that if the available ephemeral data storage does not have the requested performance, the managed nodes 1260 may allocate the ephemeral data storage on storage media having different performance characteristics, rather than failing to allocate the ephemeral data storage at all. Subsequent to sending the notification of the allocated ephemeral data storage, the method 1600 loops back to block 1604 in which the orchestrator server 1240 again receives ephemeral data storage availability information from the managed nodes 1260.

Figure 18:
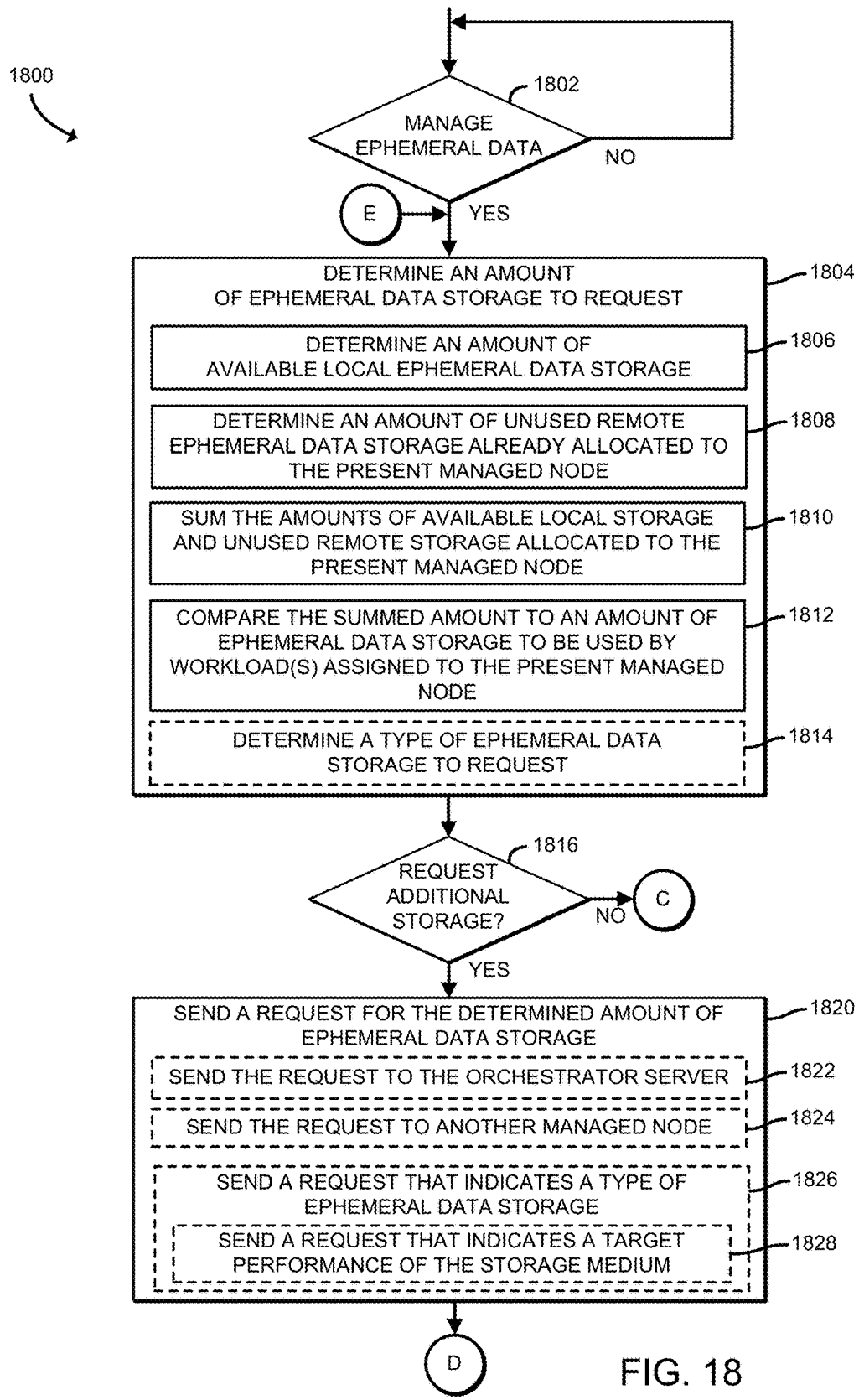
FIGS. 18-19 are a simplified flow diagram of at least one embodiment of a method for requesting the allocation of ephemeral data storage that may be performed by a managed node of FIGS. 12 and 14.

Referring now to FIG. 18, in use, a managed node 1260 may execute a method 1800 for requesting the allocation of ephemeral data storage as the workloads are performed. The method 1800 begins with block 1802, in which the managed node 1260 determines whether to manage ephemeral data. In the illustrative embodiment, the managed node 1260 determines to manage ephemeral data if the managed node 1260 is powered on and has been assigned one or more workloads. In other embodiments, the managed node 1260 may determine whether to manage ephemeral data based on other factors. Regardless, in response to a determination to manage ephemeral data, the method 1800 advances to block 1804 in which the managed node 1260 determines an amount of ephemeral data to request. In doing so, in the illustrative embodiment, the managed node 1260 determines an amount of available (i.e., unallocated) local ephemeral data storage, as indicated in block 1806. As described above, some managed nodes 1260 may have little or no local data storage devices (e.g., physical storage resources 205-1) while others may have a relatively large amount. Additionally, as indicated in block 1808, the managed node 1260 determines the amount of unused remote ephemeral data storage that has already been allocated to the managed node 1260. In block 1810, the managed node 1260 sums (i.e., adds) the amounts of available local ephemeral data storage and the unused remote ephemeral data storage that has already been allocated to the managed node 1260 to arrive at a summed amount. Further, in block 1812, the managed node 1260 compares (e.g., determines the difference between) the summed amount and an amount of ephemeral data storage to be used by the one or more workloads assigned to the present managed node 1260 (e.g., as a result of a write request or an allocation request issued by an executed workload, or based on metadata associated with the workload that indicates the ephemeral data usage patterns of the workload). The managed node 1260 may additionally determine a type of ephemeral data storage to request, as indicated in block 1814. In doing so, the managed node 1260 may determine the type of ephemeral data storage to request based on the types of operations that are performed by one or more of the assigned workloads (e.g., whether one or more of the workloads makes frequent use of the ephemeral data, etc.), as described above with reference to block 1620 of FIG. 16.

In block 1816, the managed node 1260 determines whether to request additional storage, such as by determining whether the amount determined in block 1804 is greater than zero. If not, the method 1800 advances to block 1840 of FIG. 19 in which the managed node 1260 uses the already allocated ephemeral data storage. Otherwise, the method 1800 advances to block 1820, in which the managed node 1260 sends a request for the determined amount of ephemeral data storage. In doing so, the managed node 1260 may send the request to the orchestrator server 1240, as indicated in block 1822. Alternatively, as indicated in block 1824, the managed node 1260 may send the request to one or more other managed nodes 1260, such as managed nodes 1260 that have already been identified to the present managed node 1260, such as in a configuration file, as likely to have available ephemeral data storage. In sending the request, the managed node 1260 may send a request that indicates the type of ephemeral data storage to be allocated, as indicated in block 1826. In doing so, the managed node 1260 may send a request that indicates a target performance of the underlying storage medium that is to provide the requested ephemeral data storage. Subsequently, the method 1800 advances to block 1830 of FIG. 19 in which the managed node 1260 receives a response to the request.

Figure 19:
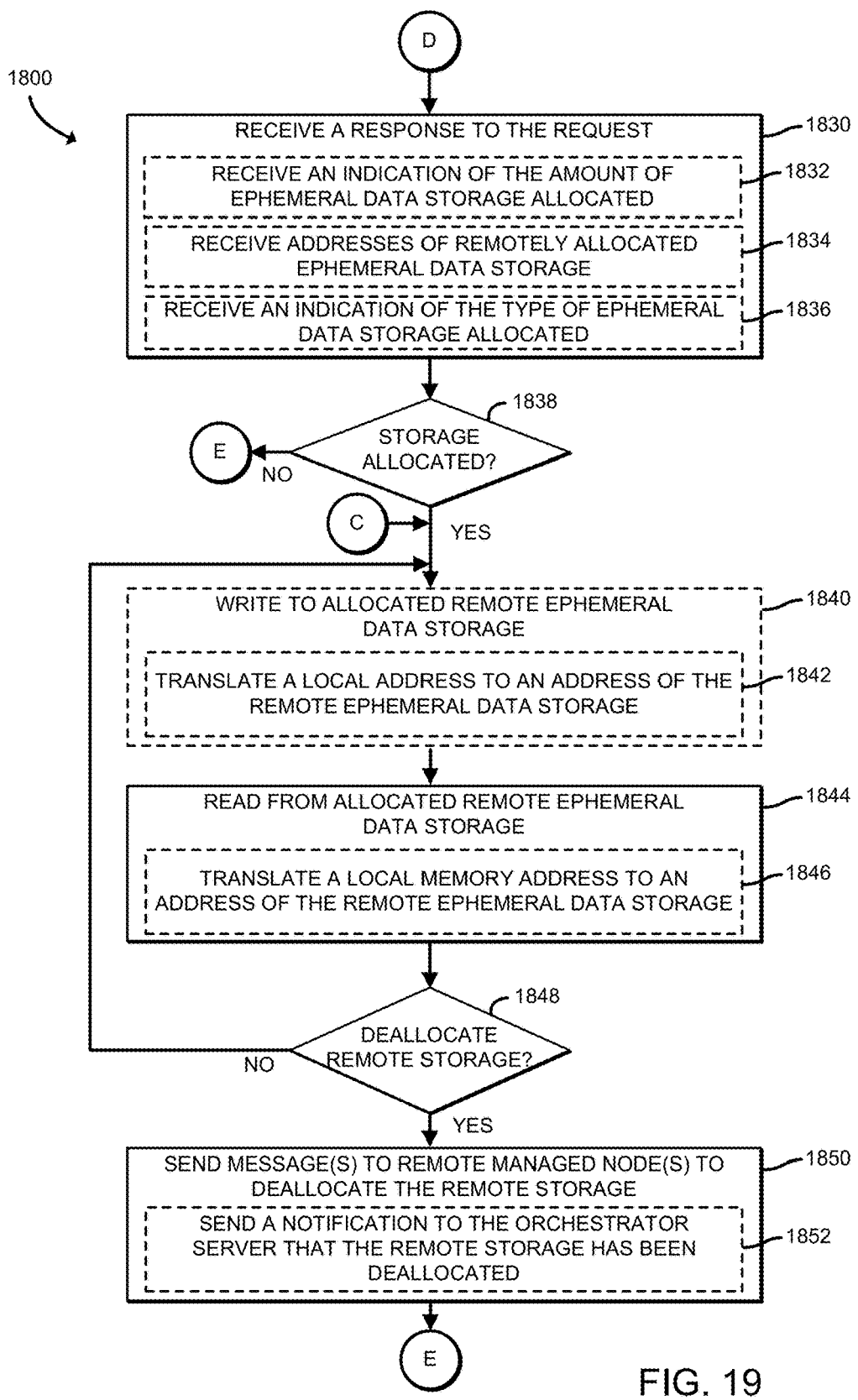

Referring now to FIG. 19, in receiving the response to the request, the managed node 1260 may receive an indication of the amount of ephemeral data storage that has been allocated, as shown in block 1832. In some instances, the amount may be zero, meaning that the requested ephemeral data storage is presently unavailable. Additionally, the managed node 1260 may receive the addresses of the remotely allocated ephemeral data storage, as indicated in block 1834. The addresses may be internal addresses used by the managed nodes 1260 that responded to the request and allocated ephemeral data storage, combined with the unique address (e.g., MAC address or other unique identifier) of the managed node 1260 where the ephemeral data storage is physically located. Additionally, as indicated in block 1836, the managed node 1260 may receive an indication of the type or types (e.g., if allocated on multiple different ephemeral data storage media) of ephemeral data storage that was allocated.

In block 1838, the managed node 1260 determines whether the request ephemeral data storage was allocated (e.g., whether the amount of ephemeral data allocated is greater than zero). If not, the method 1800 returns to block 1804 in which the managed node 1260 re-determines the amount of ephemeral data storage to request. For example, as the workloads are executed, their ephemeral data storage requirements may change. Furthermore, during the repeated determination of the amount of ephemeral data storage to request, the conditions among the other managed nodes 1260 may change such that the next time the present managed node 1260 requests the ephemeral data storage, it may be available. Referring back to block 1838, if the managed node 1260 instead determines that the requested ephemeral data storage was allocated, the method 1800 advances to block 1840 in which the managed node 1260 writes to the allocated remote ephemeral data storage. As indicated in block 1842, in writing to the remote ephemeral data storage, the managed node 1260, in the illustrative embodiment, translates a local address (e.g., a local address specified in a write request issued by a workload) to the corresponding address of the remote ephemeral data storage received in block 1834.

In block 1844, the managed node 1260 reads from the allocated remote ephemeral data storage. In doing so, in the illustrative embodiment and as indicated in block 1846, the managed node 1260 again translates the local address indicated in a read request from a workload to the corresponding address of the remote ephemeral data storage received in block 1834. While one write and one read are shown in the method 1800, it should be understood that the managed node 1260 may perform any number and sequence of reads and writes to the allocated ephemeral data storage. For example, as shown in block 1848, the managed node 1260 determines whether to deallocate the remotely allocated ephemeral data storage. If not, the method 1800 loops back to block 1840 to perform another write and/or read from the remotely allocated ephemeral data storage. Otherwise, the method 1800 advances to block 1850 in which the managed node 1260 sends a message to the managed nodes 1260 that allocated the ephemeral data storage to deallocate all or at least a portion the remote ephemeral data storage. In doing so, as indicated in block 1852, the managed node 1260 may also send a notification to the orchestrator server 1240 that the remote ephemeral data storage has been deallocated. Doing so may enable the orchestrator server 1240 to quickly update the ephemeral data map 1402 (i.e., the ephemeral data storage availability information). Subsequently, the method 1800 returns to block 1804 in which the managed node 1260 again determines an amount of ephemeral data storage to request.

Figure 20:
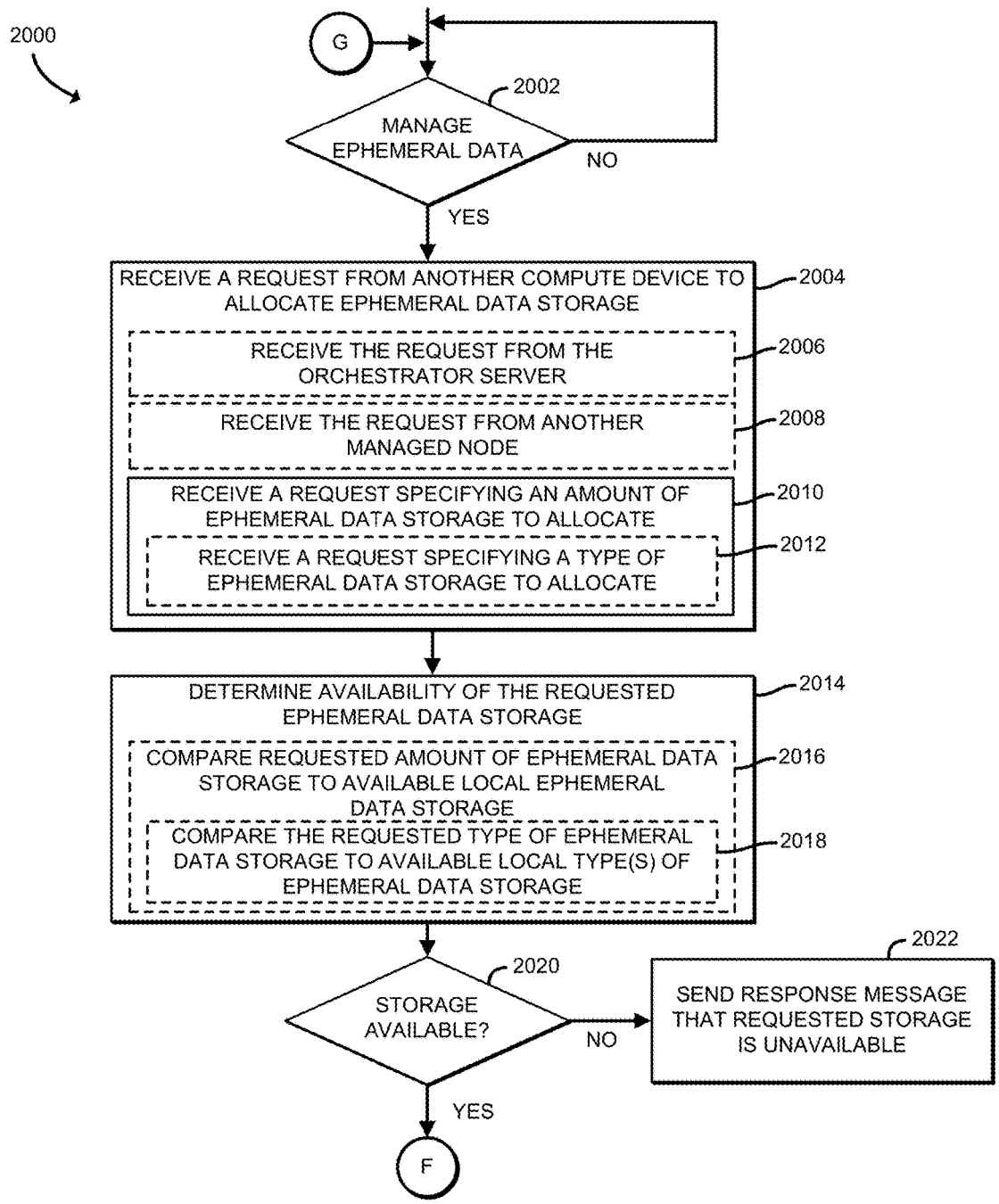
FIGS. 20-21 are a simplified flow diagram of at least one embodiment of a method for responding to a request to allocate ephemeral data storage that may be performed by a managed node of FIGS. 12 and 14.

Referring now to FIG. 20, in use, a managed node 1260 may execute a method 2000 for responding to a request to allocate ephemeral data storage as the workloads are performed. The method 2000 begins with block 2002, in which the managed node 1260 determines whether to manage ephemeral data. The managed node 1260 may make this determination in a manner similar to that described in reference to block 1802 of FIG. 18. In the illustrative embodiment, the method 2000 may execute concurrently with the method 1800, such as in separate threads or processes. In response to a determination to manage ephemeral data, the method 2000 advances to block 2004 in which the managed node 1260 receives a request from another compute device to allocate ephemeral data storage. In receiving the request, the managed node 1260 may receive the request from the orchestrator server 1240 (e.g., as the notification sent in block 1634 of FIG. 17), as shown in block 2006. Alternatively, the managed node 1260 may receive the request from another managed node 1260, as indicated in block 2008. Further, as indicated in block 2010, the managed node 1260 receives a request that specifies an amount of ephemeral data storage to allocate (e.g., a number of blocks or bytes). Furthermore, the request may specify a type of ephemeral data storage to allocate, as indicated in block 2012. As described above, in the illustrative embodiment, an indication of a type of data storage may be embodied as any data indicative of a requested performance of the underlying data storage medium that is to provide the ephemeral data storage.

After receiving the request, the method 2000 advances to block 2014, in which the managed node 1260 determines an availability of the requested ephemeral data storage. In doing so, the managed node 1260 compares the requested amount to the available amount of local ephemeral data storage, as indicated in block 2016. Further, the managed node 1260 may compare the requested type to the types of available ephemeral data storage (e.g., different SSDs or other ephemeral data storage devices) local to the managed node 1260, as indicated in block 2018. Subsequently, the method 2000 advances to block 2020, in which the managed node 1260 determines whether the requested ephemeral data storage is available (e.g., whether the available amount is at least equal to the requested amount and, in some embodiments, whether the available types satisfy the requested type). In response to a determination that the requested ephemeral data storage is unavailable, the method 2000 advances to block 2022, in which the managed node 1260 sends a response message indicating that the requested ephemeral data storage is unavailable. Otherwise, the method 2000 advances to block 2024 of FIG. 21, in which the managed node 1260 allocates the requested ephemeral data storage.

Figure 21:
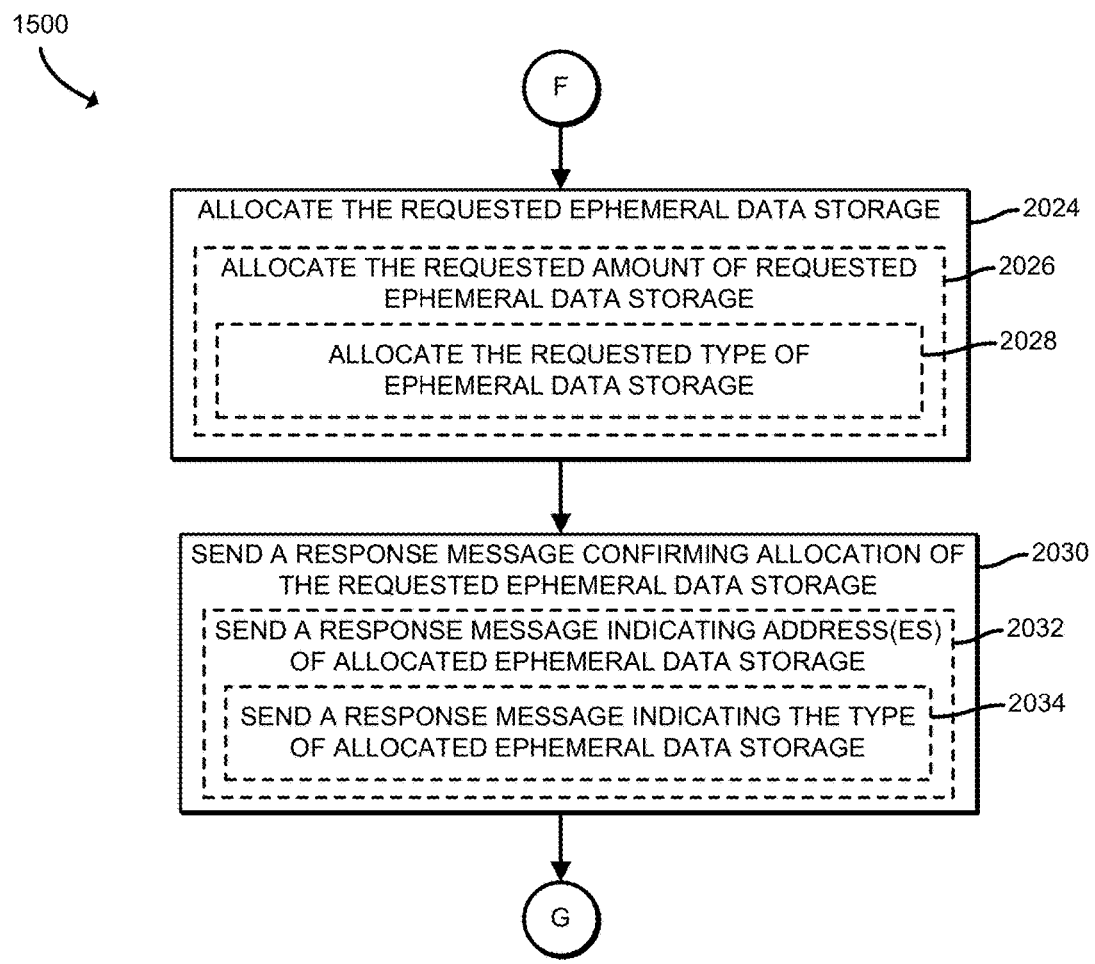

Referring now to FIG. 21, in allocating the requested ephemeral data storage, the managed node 1260, in the illustrative embodiment, allocates the amount of ephemeral data storage specified in the request, as indicated in block 2026. Further, as indicated in block 2028, the managed node 1260 may also allocate the type of requested ephemeral data storage, if the request specified a type and the managed node 1260 includes an ephemeral data storage medium that satisfies the type. Subsequently, the method 2000 advances to block 2030 in which the managed node 1260 sends a response message confirming allocation of the requested ephemeral data storage. In doing so, as indicated in block 2032, the managed node 1260 may send a response that indicates the addresses of the allocated ephemeral data storage, as also described with reference to block 1640 of FIG. 17. Further, as indicated in block 2034, the managed node 1260 may send an indication of the type of allocated ephemeral data storage, as also described with reference to block 1642 of FIG. 17.

EXAMPLES

Illustrative examples of the technologies disclosed herein are provided below. An embodiment of the technologies may include any one or more, and any combination of, the examples described below.

Example 1 includes an orchestrator server to manage the allocation of ephemeral data storage among a plurality of managed nodes, the orchestrator server comprising a network communicator to receive ephemeral data storage availability information from the plurality of managed nodes, wherein the ephemeral data storage availability information is indicative of at least an amount of ephemeral data storage available for allocation in the corresponding managed node and receive a request from a first managed node of the plurality of managed nodes to allocate an amount of ephemeral data storage as the first managed node executes one or more workloads; an ephemeral data storage request manager to determine, as a function of the ephemeral data storage availability information, an availability of the requested amount of ephemeral data storage and allocate, in response to a determination that the requested amount of ephemeral data storage is available from one or more other managed nodes of the plurality of managed nodes, the requested amount of ephemeral data storage to the first managed node as the first managed node executes the one or more workloads.

Example 2 includes the subject matter of Example 1, and wherein the network communicator is further to send, to the first managed node, a notification indicative of the amount of allocated ephemeral data storage.

Example 3 includes the subject matter of any of Examples 1 and 2, and wherein to receive a request from a first managed node comprises to receive a request indicative of a type of ephemeral data storage to be allocated, wherein the type is indicative of a performance of a data storage medium to provide the ephemeral data storage.

Example 4 includes the subject matter of any of Examples 1-3, and wherein the network communicator is further to send, in response to allocation of the ephemeral data storage, a notification to the first managed node indicative of a type of the allocated ephemeral data storage, wherein the type is indicative of a performance of a data storage medium to provide the allocated ephemeral data storage.

Example 5 includes the subject matter of any of Examples 1-4, and wherein the network communicator is further to send, in response to allocation of the ephemeral data storage, a notification to the first managed node indicative of one or more addresses of the allocated ephemeral data storage.

Example 6 includes the subject matter of any of Examples 1-5, and wherein to receive the ephemeral data storage availability information comprises to receive a deallocation notification that ephemeral data storage has been deallocated by at least one of the managed nodes.

Example 7 includes the subject matter of any of Examples 1-6, and wherein to receive the ephemeral data storage availability information comprises to receive information indicative of a type of available ephemeral data storage, wherein the type is indicative of a performance of a data storage device associated with the available ephemeral data storage medium.

Example 8 includes the subject matter of any of Examples 1-7, and wherein to determine the availability of the requested amount of ephemeral data storage comprises to compare the requested amount of ephemeral data storage to the ephemeral data storage availability information.

Example 9 includes the subject matter of any of Examples 1-8, and wherein to determine the availability of the requested amount of ephemeral data storage further comprises to compare a requested type of ephemeral data storage to one or more types of ephemeral data storage indicated in the ephemeral data storage availability information.

Example 10 includes the subject matter of any of Examples 1-9, and wherein to allocate the ephemeral data storage comprises to send a notification to the one or more other managed nodes to allocate at least a portion of the requested amount of ephemeral data storage.

Example 11 includes the subject matter of any of Examples 1-10, and wherein to send a notification comprises to send multiple notifications to each of multiple managed nodes to allocate portions of the requested amount of ephemeral data storage.

Example 12 includes the subject matter of any of Examples 1-11, and wherein to send the notification to the one or more other managed nodes further comprises to send a notification of a requested type of ephemeral data storage to the one or more other managed nodes.

Example 13 includes the subject matter of any of Examples 1-12, and wherein the ephemeral data storage request manager is further to update, in response to allocation of the ephemeral data storage, the ephemeral data storage availability information to indicate the amount of allocated ephemeral data storage.

Example 14 includes the subject matter of any of Examples 1-13, and wherein to update the ephemeral data storage availability information further comprises to update the ephemeral data storage availability information to indicate at least one of an address or a type of the allocated ephemeral data storage.

Example 15 includes a method for managing the allocation of ephemeral data storage among a plurality of managed nodes, the method comprising receiving, by an orchestrator server, ephemeral data storage availability information from the plurality of managed nodes, wherein the ephemeral data storage availability information is indicative of at least an amount of ephemeral data storage available for allocation in the corresponding managed node; receiving, by the orchestrator server, a request from a first managed node of the plurality of managed nodes to allocate an amount of ephemeral data storage as the first managed node executes one or more workloads; determining, by the orchestrator server and as a function of the ephemeral data storage availability information, an availability of the requested amount of ephemeral data storage; and allocating, by the orchestrator server and in response to a determination that the requested amount of ephemeral data storage is available from at least a one or more other managed nodes of the plurality of managed nodes, the requested amount of ephemeral data storage to the first managed node as the first managed node executes the one or more workloads.

Example 16 includes the subject matter of Example 15, and further including sending, by the orchestrator server to the first managed node, a notification indicative of the amount of allocated ephemeral data storage.

Example 17 includes the subject matter of any of Examples 15 and 16, and wherein receiving a request from a first managed node comprises receiving a request indicative of a type of ephemeral data storage to be allocated, wherein the type is indicative of a performance of a data storage medium to provide the ephemeral data storage.

Example 18 includes the subject matter of any of Examples 15-17, and further including sending, by the orchestrator server and in response to allocation of the ephemeral data storage, a notification to the first managed node indicative of a type of the allocated ephemeral data storage, wherein the type is indicative of a performance of a data storage medium to provide the allocated ephemeral data storage.

Example 19 includes the subject matter of any of Examples 15-18, and further including sending, by the orchestrator server in response to allocation of the ephemeral data storage, a notification to the first managed node indicative of one or more addresses of the allocated ephemeral data storage.

Example 20 includes the subject matter of any of Examples 15-19, and wherein receiving the ephemeral data storage availability information comprises receiving a deallocation notification that ephemeral data storage has been deallocated by at least one of the managed nodes.

Example 21 includes the subject matter of any of Examples 15-20, and wherein receiving the ephemeral data storage availability information comprises receiving information indicative of a type of available ephemeral data storage, wherein the type is indicative of a performance of a data storage medium associated with the available ephemeral data storage.

Example 22 includes the subject matter of any of Examples 15-21, and wherein determining the availability of the requested amount of ephemeral data storage comprises comparing the requested amount of ephemeral data storage to the ephemeral data storage availability information.

Example 23 includes the subject matter of any of Examples 15-22, and wherein determining the availability of the requested amount of ephemeral data storage further comprises comparing a requested type of ephemeral data storage to one or more types of ephemeral data storage indicated in the ephemeral data storage availability information.

Example 24 includes the subject matter of any of Examples 15-23, and wherein allocating the ephemeral data storage comprises sending a notification to the one or more other managed nodes to allocate at least a portion of the requested amount of ephemeral data storage.

Example 25 includes the subject matter of any of Examples 15-24, and wherein sending a notification comprises sending multiple notifications to each of multiple managed nodes to allocate portions of the requested amount of ephemeral data storage.

Example 26 includes the subject matter of any of Examples 15-25, and wherein sending the notification to the one or more other managed nodes further comprises sending a notification of a requested type of ephemeral data storage to the one or more other managed nodes.

Example 27 includes the subject matter of any of Examples 15-26, and further including updating, by the orchestrator server and in response to allocation of the ephemeral data storage, the ephemeral data storage availability information to indicate the amount of allocated ephemeral data storage.

Example 28 includes the subject matter of any of Examples 15-27, and wherein updating the ephemeral data storage availability information further comprises updating the ephemeral data storage availability information to indicate at least one of an address or a type of the allocated ephemeral data storage.

Example 29 includes one or more computer-readable storage media comprising a plurality of instructions that, when executed by an orchestrator server, cause the orchestrator server to perform the method of any of Examples 15-28.

Example 30 includes an orchestrator server to manage the allocation of ephemeral data storage among a plurality of managed nodes, the orchestrator server comprising means for receiving ephemeral data storage availability information from the plurality of managed nodes, wherein the ephemeral data storage availability information is indicative of at least an amount of ephemeral data storage available for allocation in the corresponding managed node; means for receiving a request from a first managed node of the plurality of managed nodes to allocate an amount of ephemeral data storage as the first managed node executes one or more workloads; means for determining, as a function of the ephemeral data storage availability information, an availability of the requested amount of ephemeral data storage; and means for allocating, in response to a determination that the requested amount of ephemeral data storage is available from at least a one or more other managed nodes of the plurality of managed nodes, the requested amount of ephemeral data storage to the first managed node as the first managed node executes the one or more workloads.

Example 31 includes the subject matter of Example 30, and further including means for sending, to the first managed node, a notification indicative of the amount of allocated ephemeral data storage.

Example 32 includes the subject matter of any of Examples 30 and 31, and wherein the means for receiving a request from a first managed node comprises means for receiving a request indicative of a type of ephemeral data storage to be allocated, wherein the type is indicative of a performance of a data storage medium to provide the ephemeral data storage.

Example 33 includes the subject matter of any of Examples 30-32, and further including means for sending, in response to allocation of the ephemeral data storage, a notification to the first managed node indicative of a type of the allocated ephemeral data storage, wherein the type is indicative of a performance of a data storage medium to provide the allocated ephemeral data storage.

Example 34 includes the subject matter of any of Examples 30-33, and further including means for sending, in response to allocation of the ephemeral data storage, a notification to the first managed node indicative of one or more addresses of the allocated ephemeral data storage.

Example 35 includes the subject matter of any of Examples 30-34, and wherein the means for receiving the ephemeral data storage availability information comprises means for receiving a deallocation notification that ephemeral data storage has been deallocated by at least one of the managed nodes.

Example 36 includes the subject matter of any of Examples 30-35, and wherein the means for receiving the ephemeral data storage availability information comprises means for receiving information indicative of a type of available ephemeral data storage, wherein the type is indicative of a performance of a data storage medium associated with the available ephemeral data storage.

Example 37 includes the subject matter of any of Examples 30-36, and wherein the means for determining the availability of the requested amount of ephemeral data storage comprises means for comparing the requested amount of ephemeral data storage to the ephemeral data storage availability information.

Example 38 includes the subject matter of any of Examples 30-37, and wherein the means for determining the availability of the requested amount of ephemeral data storage further comprises means for comparing a requested type of ephemeral data storage to one or more types of ephemeral data storage indicated in the ephemeral data storage availability information.

Example 39 includes the subject matter of any of Examples 30-38, and wherein the means for allocating the ephemeral data storage comprises means for sending a notification to the one or more other managed nodes to allocate at least a portion of the requested amount of ephemeral data storage.

Example 40 includes the subject matter of any of Examples 30-39, and wherein the means for sending a notification comprises means for sending multiple notifications to each of multiple managed nodes to allocate portions of the requested amount of ephemeral data storage.

Example 41 includes the subject matter of any of Examples 30-40, and wherein the means for sending the notification to the one or more other managed nodes further comprises means for sending a notification of a requested type of ephemeral data storage to the one or more other managed nodes.

Example 42 includes the subject matter of any of Examples 30-41, and further including means for updating, in response to allocation of the ephemeral data storage, the ephemeral data storage availability information to indicate the amount of allocated ephemeral data storage.

Example 43 includes the subject matter of any of Examples 30-42, and wherein the means for updating the ephemeral data storage availability information further comprises means for updating the ephemeral data storage availability information to indicate at least one of an address or a type of the allocated ephemeral data storage.

Example 44 includes a managed node of a set of managed nodes to dynamically allocate ephemeral data storage, the managed node comprising an ephemeral data storage manager to determine, as the managed node executes one or more workloads, an amount of ephemeral data storage to allocate from one or more other managed nodes of the set; and a network communicator to send a request for allocation of the determined amount of ephemeral data storage and receive a response to the request, wherein the response includes addresses of the allocated ephemeral data storage on the one or more other managed nodes of the set.

Example 45 includes the subject matter of Example 44, and wherein the ephemeral data storage manager is further to write to the allocated ephemeral data storage at one or more of the addresses after receipt of the response.

Example 46 includes the subject matter of any of Examples 44 and 45, and wherein to write to the allocated ephemeral data storage comprises to translate a local data storage address to one of the addresses included in the response.

Example 47 includes the subject matter of any of Examples 44-46, and wherein the ephemeral data storage manager is further to read from the allocated ephemeral data storage.

Example 48 includes the subject matter of any of Examples 44-47, and wherein to read from the allocated ephemeral data storage comprises to translate a local data storage address to one of the addresses included in the response.

Example 49 includes the subject matter of any of Examples 44-48, and wherein to send the request to allocate comprises to send the request to an orchestrator server in communication with the set of managed nodes.

Example 50 includes the subject matter of any of Examples 44-49, and wherein to send the request to allocate comprises to send the request to one or more other managed nodes in the set.

Example 51 includes the subject matter of any of Examples 44-50, and wherein the ephemeral data storage manager is further to determine whether to deallocate the allocated ephemeral data storage; and the network communicator is further to send, in response to a determination to deallocate the allocated ephemeral data storage, a message to each managed node where the ephemeral data storage was allocated to deallocate the allocated ephemeral data storage.

Example 52 includes the subject matter of any of Examples 44-51, and wherein the network communicator is further to send a notification to an orchestrator node in communication with the set of managed nodes that the ephemeral data storage has been deallocated.

Example 53 includes the subject matter of any of Examples 44-52, and wherein the ephemeral data storage manager is further to determine a type of ephemeral data storage to allocate, wherein the type is indicative of a target performance of a data storage medium associated with the ephemeral data storage.

Example 54 includes the subject matter of any of Examples 44-53, and wherein to send the request to allocate comprises to include an indication of the determined type of ephemeral data storage in the request.

Example 55 includes the subject matter of any of Examples 44-54, and wherein the network communicator is further to receive a request to allocate ephemeral data storage that is local to the managed node for another managed node in the set; and the ephemeral data storage manager is further to allocate, in response to the received request, the local ephemeral data storage.

Example 56 includes the subject matter of any of Examples 44-55, and wherein to receive the request comprises to receive the request from the other managed node or from an orchestrator server in communication with the set of managed nodes.

Example 57 includes a method for dynamically allocating ephemeral data storage, the method comprising determining, by a managed node as the managed node executes one or more workloads, an amount of ephemeral data storage to allocate from one or more other managed nodes of a set of managed nodes; sending, by the managed node, a request for allocation of the determined amount of ephemeral data storage; and receiving, by the managed node, a response to the request, wherein the response includes addresses of the allocated ephemeral data storage on the one or more other managed nodes of the set.

Example 58 includes the subject matter of Example 57, and further including writing, by the managed node, to the allocated ephemeral data storage at one or more of the addresses after receipt of the response.

Example 59 includes the subject matter of any of Examples 57 and 58, and wherein writing to the allocated ephemeral data storage comprises translating a local data storage address to one of the addresses included in the response.

Example 60 includes the subject matter of any of Examples 57-59, and further including reading, by the managed node, from the allocated ephemeral data storage.

Example 61 includes the subject matter of any of Examples 57-60, and wherein reading from the allocated ephemeral data storage comprises translating a local data storage address to one of the addresses included in the response.

Example 62 includes the subject matter of any of Examples 57-61, and wherein sending the request to allocate comprises sending the request to an orchestrator server in communication with the set of managed nodes.

Example 63 includes the subject matter of any of Examples 57-62, and wherein sending the request to allocate comprises sending the request to one or more other managed nodes in the set.

Example 64 includes the subject matter of any of Examples 57-63, and further including determining, by the managed node, whether to deallocate the allocated ephemeral data storage; and sending, by the managed node and in response to a determination to deallocate the allocated ephemeral data storage, a message to each managed node where the ephemeral data storage was allocated to deallocate the allocated ephemeral data storage.

Example 65 includes the subject matter of any of Examples 57-64, and further including sending, by the managed node, a notification to an orchestrator node in communication with the set of managed nodes that the ephemeral data storage has been deallocated.

Example 66 includes the subject matter of any of Examples 57-65, and further including determining, by the managed node, a type of ephemeral data storage to allocate, wherein the type is indicative of a target performance of a data storage medium associated with the ephemeral data storage.

Example 67 includes the subject matter of any of Examples 57-66, and wherein sending the request to allocate comprises including an indication of the determined type of ephemeral data storage in the request.

Example 68 includes the subject matter of any of Examples 57-67, and further including receiving, by the managed node, a request to allocate ephemeral data storage that is local to the managed node for another managed node in the set; and allocating, by the managed node and in response to the received request, the local ephemeral data storage.

Example 69 includes the subject matter of any of Examples 57-68, and wherein receiving the request comprises receiving the request from the other managed node or from an orchestrator server in communication with the set of managed nodes.

Example 70 includes one or more computer-readable storage media comprising a plurality of instructions that, when executed by a managed node, cause the managed node to perform the method of any of Examples 57-69.

Example 71 includes a managed node comprising means for determining, as the managed node executes one or more workloads, an amount of ephemeral data storage to allocate from one or more other managed nodes of a set of managed nodes; means for sending a request for allocation of the determined amount of ephemeral data storage; and means for receiving a response to the request, wherein the response includes addresses of the allocated ephemeral data storage on the one or more other managed nodes of the set.

Example 72 includes the subject matter of Example 71, and further including means for writing to the allocated ephemeral data storage at one or more of the addresses after receipt of the response.

Example 73 includes the subject matter of any of Examples 71 and 72, and wherein the means for writing to the allocated ephemeral data storage comprises means for translating a local data storage address to one of the addresses included in the response.

Example 74 includes the subject matter of any of Examples 71-73, and further including means for reading from the allocated ephemeral data storage.

Example 75 includes the subject matter of any of Examples 71-74, and wherein the means for reading from the allocated ephemeral data storage comprises means for translating a local data storage address to one of the addresses included in the response.

Example 76 includes the subject matter of any of Examples 71-75, and wherein the means for sending the request to allocate comprises means for sending the request to an orchestrator server in communication with the set of managed nodes.

Example 77 includes the subject matter of any of Examples 71-76, and wherein the means for sending the request to allocate comprises means for sending the request to one or more other managed nodes in the set.

Example 78 includes the subject matter of any of Examples 71-77, and further including means for determining whether to deallocate the allocated ephemeral data storage; and means for sending, in response to a determination to deallocate the allocated ephemeral data storage, a message to each managed node where the ephemeral data storage was allocated to deallocate the allocated ephemeral data storage.

Example 79 includes the subject matter of any of Examples 71-78, and further including means for sending a notification to an orchestrator node in communication with the set of managed nodes that the ephemeral data storage has been deallocated.

Example 80 includes the subject matter of any of Examples 71-79, and further including means for determining a type of ephemeral data storage to allocate, wherein the type is indicative of a target performance of a data storage medium associated with the ephemeral data storage.

Example 81 includes the subject matter of any of Examples 71-80, and wherein the means for sending the request to allocate comprises means for including an indication of the determined type of ephemeral data storage in the request.

Example 82 includes the subject matter of any of Examples 71-81, and further including means for receiving a request to allocate ephemeral data storage that is local to the managed node for another managed node in the set; and means for allocating, in response to the received request, the local ephemeral data storage.

Example 83 includes the subject matter of any of Examples 71-82, and wherein the means for receiving the request comprises means for receiving the request from the other managed node or from an orchestrator server in communication with the set of managed nodes.

The invention claimed is:

1. An orchestrator server to manage the allocation of ephemeral data storage among a plurality of managed nodes, the orchestrator server comprising:
   network communicator circuitry to receive ephemeral data storage availability information from the plurality of managed nodes, wherein the ephemeral data storage availability information is indicative of at least an amount of ephemeral data storage available for allocation in the corresponding managed node and receive a request from a first managed node of the plurality of managed nodes to allocate an amount and a type of ephemeral data storage as the first managed node executes one or more workloads, wherein the type is indicative of a performance of a data storage medium to provide the ephemeral data storage;
   ephemeral data storage request manager circuitry to determine, as a function of the ephemeral data storage availability information, an availability of the requested amount of ephemeral data storage and allocate, in response to a determination that the requested amount of ephemeral data storage is available from one or more other managed nodes of the plurality of managed nodes, the requested amount of ephemeral data storage to the first managed node as the first managed node executes the one or more workloads.

2. The orchestrator server of claim 1, wherein the network communicator circuitry is further to send, to the first managed node, a notification indicative of the amount of allocated ephemeral data storage.

3. The orchestrator server of claim 1, wherein the network communicator circuitry is further to send, in response to allocation of the ephemeral data storage, a notification to the first managed node indicative of the type of the allocated ephemeral data storage.

4. The orchestrator server of claim 1, wherein the network communicator circuitry is further to send, in response to allocation of the ephemeral data storage, a notification to the first managed node indicative of one or more addresses of the allocated ephemeral data storage.

5. The orchestrator server of claim 1, wherein to receive the ephemeral data storage availability information comprises to receive a deallocation notification that ephemeral data storage has been deallocated by at least one of the managed nodes.

6. The orchestrator server of claim 1, wherein to receive the ephemeral data storage availability information comprises to receive information indicative of the type of available ephemeral data storage.

7. The orchestrator server of claim 1, wherein to determine the availability of the requested amount of ephemeral data storage comprises to compare the requested amount of ephemeral data storage to the ephemeral data storage availability information.

8. The orchestrator server of claim 7, wherein to determine the availability of the requested amount of ephemeral data storage further comprises to compare the requested type of ephemeral data storage to one or more types of ephemeral data storage indicated in the ephemeral data storage availability information.

9. The orchestrator server of claim 1, wherein to allocate the ephemeral data storage comprises to send a notification to the one or more other managed nodes to allocate at least a portion of the requested amount of ephemeral data storage.

10. The orchestrator server of claim 9, wherein to send a notification comprises to send multiple notifications to each of multiple managed nodes to allocate portions of the requested amount of ephemeral data storage.

11. One or more non-transitory computer-readable storage media comprising a plurality of instructions that, when executed by an orchestrator server, cause the orchestrator server to:
receive ephemeral data storage availability information from the plurality of managed nodes, wherein the ephemeral data storage availability information is indicative of at least an amount of ephemeral data storage available for allocation in the corresponding managed node;
receive a request from a first managed node of the plurality of managed nodes to allocate an amount and a type of ephemeral data storage as the first managed node executes one or more workloads, wherein the type is indicative of a performance of a data storage medium to provide the ephemeral data storage;
determine, as a function of the ephemeral data storage availability information, an availability of the requested amount of ephemeral data storage; and
allocate, in response to a determination that the requested amount of ephemeral data storage is available from one or more other managed nodes of the plurality of managed nodes, the requested amount of ephemeral data storage to the first managed node as the first managed node executes the one or more workloads.

12. The one or more non-transitory computer-readable storage media of claim 11, wherein the plurality of instructions, when executed, further cause the orchestrator server to send, to the first managed node, a notification indicative of the amount of allocated ephemeral data storage.

13. The one or more non-transitory computer-readable storage media of claim 11, wherein the plurality of instructions, when executed, further cause the orchestrator server to send, in response to allocation of the ephemeral data storage, a notification to the first managed node indicative of the type of the allocated ephemeral data storage.

14. The one or more non-transitory computer-readable storage media of claim 11, wherein the plurality of instructions, when executed, further cause the orchestrator server to send, in response to allocation of the ephemeral data storage, a notification to the first managed node indicative of one or more addresses of the allocated ephemeral data storage.

15. The one or more non-transitory computer-readable storage media of claim 11, wherein to receive the ephemeral data storage availability information comprises to receive a deallocation notification that ephemeral data storage has been deallocated by at least one of the managed nodes.

16. The one or more non-transitory computer-readable storage media of claim 11, wherein to receive the ephemeral data storage availability information comprises to receive information indicative of the type of available ephemeral data storage.

17. The one or more non-transitory computer-readable storage media of claim 11, wherein to determine the availability of the requested amount of ephemeral data storage comprises to compare the requested amount of ephemeral data storage to the ephemeral data storage availability information.

18. The one or more non-transitory computer-readable storage media of claim 17, wherein to determine the availability of the requested amount of ephemeral data storage further comprises to compare the requested type of ephemeral data storage to one or more types of ephemeral data storage indicated in the ephemeral data storage availability information.

19. The one or more non-transitory computer-readable storage media of claim 11, wherein to allocate the ephemeral data storage comprises to send a notification to the one or more other managed nodes to allocate at least a portion of the requested amount of ephemeral data storage.

20. A method for managing the allocation of ephemeral data storage among a plurality of managed nodes, the method comprising:
receiving, by an orchestrator server, ephemeral data storage availability information from the plurality of managed nodes, wherein the ephemeral data storage availability information is indicative of at least an amount of ephemeral data storage available for allocation in the corresponding managed node;
receiving, by the orchestrator server, a request from a first managed node of the plurality of managed nodes to allocate an amount and a type of ephemeral data storage as the first managed node executes one or more workloads, wherein the type is indicative of a performance of a data storage medium to provide the ephemeral data storage;
determining, by the orchestrator server and as a function of the ephemeral data storage availability information, an availability of the requested amount of ephemeral data storage; and
allocating, by the orchestrator server and in response to a determination that the requested amount of ephemeral data storage is available from at least a one or more other managed nodes of the plurality of managed nodes, the requested amount of ephemeral data storage to the first managed node as the first managed node executes the one or more workloads.

21. The method of claim 20, further comprising sending, by the orchestrator server to the first managed node, a notification indicative of the amount of allocated ephemeral data storage.

22. The method of claim 20, further comprising sending, by the orchestrator server and in response to allocation of the ephemeral data storage, a notification to the first managed node indicative of the type of the allocated ephemeral data storage.

* * * * *